United States Patent
Fan et al.

(10) Patent No.: US 11,936,534 B2
(45) Date of Patent: Mar. 19, 2024

(54) DATA ANALYTICS FOR NETWORK AUTOMATION UTILIZING USER QOE DATA

(71) Applicant: NEC Laboratories Europe GmbH, Heidelberg (DE)

(72) Inventors: Linghang Fan, Woking (GB); Hassan Al-Kanani, Iver (GB); Iskren Ianev, Reading (GB)

(73) Assignee: NEC CORPORATION, Tokyo (JP)

( * ) Notice: Subject to any disclaimer, the term of this patent is extended or adjusted under 35 U.S.C. 154(b) by 434 days.

(21) Appl. No.: 17/263,556

(22) PCT Filed: Jul. 31, 2019

(86) PCT No.: PCT/EP2019/070711
§ 371 (c)(1),
(2) Date: Jan. 27, 2021

(87) PCT Pub. No.: WO2020/025715
PCT Pub. Date: Feb. 6, 2020

(65) Prior Publication Data
US 2021/0250251 A1    Aug. 12, 2021

(30) Foreign Application Priority Data
Jul. 31, 2018 (EP) .................. 18186721

(51) Int. Cl.
*H04L 41/5009* (2022.01)
*H04L 41/0816* (2022.01)
*H04W 24/02* (2009.01)

(52) U.S. Cl.
CPC ...... *H04L 41/5009* (2013.01); *H04L 41/0816* (2013.01); *H04W 24/02* (2013.01)

(58) Field of Classification Search
CPC . H04L 41/5009; H04L 41/0816; H04L 41/40; H04L 41/14; H04L 41/5041; H04L 43/0817; H04W 24/02
See application file for complete search history.

(56) References Cited

U.S. PATENT DOCUMENTS

2019/0222489 A1* 7/2019 Shan .................. H04L 41/5032
2019/0356558 A1* 11/2019 Han ...................... H04L 67/51
(Continued)

OTHER PUBLICATIONS

3GPP TR 28.802, 3rd Generation Partnership Project (3GPP), Mobile Competence Centre; 650, Route Des Lucioles; F-06921 Sophia-Antipolis Cedex, France, vol. SA WG5, No. V15.0.0, Jan. 4, 2018 (Jan. 4, 2018), pp. 1-38, XP051392294 (Year: 2018).*
(Continued)

*Primary Examiner* — Natasha W Cosme
*Assistant Examiner* — Yewon Kim
(74) *Attorney, Agent, or Firm* — Leydig, Voit & Mayer, Ltd.

(57) ABSTRACT

A method is performed by a network function for providing data analytics services. The method includes performing data analytics based on user data for deriving a Quality of Experience (QoE) parameter for at least one user. At least one of a result of the data analytics and QoE analytics information is provided to an Operations, Administration and Maintenance (OAM) management function.

7 Claims, 18 Drawing Sheets

(56) References Cited

U.S. PATENT DOCUMENTS

2021/0105193 A1* 4/2021 Chong ................ H04L 41/5067
2021/0266765 A1* 8/2021 Zhang ................. H04W 24/10

OTHER PUBLICATIONS

3GPP TR 23.791, 3rd Generation Partnership Project (3GPP), Mobile Competence Centre; 650, Route Des Lucioles ; F-06921 Sophia-Antipolis Cedex; France, vol. SA WG2, No. V0.5.0, Jul. 19, 2018 (Jul. 19, 2018), pp. 1-48, XP051475034 (Year: 2018).*
3GPP TS 28.533, 3rd Generation Partnership Project (3GPP), Mobile Competence Centre; 650, Route Des Lucioles ; F-06921 Sophia-Antipolis Cedex; France, vol. SA WG5, No. V0.4.0, Jul. 6, 2018 (Jul. 6, 2018), pp. 1-21 (Year: 2018).*
3GPP, "3rd Generation Partnership Project; Technical Specification Group Services and System Aspects; Telecommunication management; Study on management aspects of next generation network architecture and features; (Release 15)", 3GPP Standard; Technical Report; 3GPP TR 28.802, 3rd Generation Partnership Project (3GPP), Mobile Competence Centre; 650, Route Des Lucioles; F-06921 Sophia-Antipolis Cedex, France, vol. SA WG5, No. V15.0.0, Jan. 4, 2018 (Jan. 4, 2018), pp. 1-38, XP051392294.
3GPP, "3rd Generation Partnership Project; Technical Specification Group Services and System Aspects; Study of Enablers for Network Automation for 5G (Release 16)", 3GPP Standard; Technical Report; 3GPP TR 23.791, 3rd Generation Partnership Project (3GPP), Mobile Competence Centre; 650, Route Des Lucioles ; F-06921 Sophia-Antipolis Cedex; France, vol. SA WG2, No. V0.5.0, Jul. 19, 2018 (Jul. 19, 2018), pp. 1-48, XP051475034.

* cited by examiner

DATA ANALYTICS FOR NETWORK AUTOMATION UTILIZING USER QOE DATA

CROSS-REFERENCE TO PRIOR APPLICATIONS

This application is a U.S. National Phase Application under 35 U.S.C. § 371 of International Application No. PCT/EP2019/070711, filed on Jul. 31, 2019, and claims benefit to European Patent Application No. EP 18186721.9, filed on Jul. 31, 2018. The International Application was published in English on Feb. 6, 2020 as WO 2020/025715 A1 under PCT Article 21(2).

FIELD

The present invention relates to a communication system. The invention has particular but not exclusive relevance to wireless communication systems and devices thereof operating according to the 3rd Generation Partnership Project (3GPP) standards or equivalents or derivatives thereof. The invention has particular although not exclusive relevance to network automation in the so-called '5G' (or 'Next Generation') systems.

BACKGROUND

The 3GPP Working Groups are currently defining the 5G system and the 3GPP TSG SA WG2 is specifying the system architecture and procedures for 5G system.

In order to provide network data analytics in 5G networks, a new Network Function (NF) called Network Data Analytics Function (NWDAF) is being specified in the 3GPP TSG SA WG2. According to 3GPP Technical Specification (TS) 23.501 V15.2.0, TS 23.502 V15.2.0, and TS 23.503 V15.2.0, the NWDAF represents network analytics logical function.

The 3GPP TSG SA WG5 is specifying the telecom management system architecture and corresponding procedures for 5G system. Management Data Analytics Service (MDAS) has been introduced in SA5 to provide data analytics services in OAM (TS 28.533 V0.4.0).

Recently, new study has been proposed to investigate how to use user QoE data to support QoS profile provisioning in Technical Report (TR) 23.791 V0.4.0.

SUMMARY

In an embodiment, the present invention provides a method performed by a network function providing data analytics services. The method includes performing data analytics based on user data for deriving a Quality of Experience (QoE) parameter for at least one user. At least one of a result of the data analytics and QoE analytics information is provided to an Operations, Administration and Maintenance (OAM) management function.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
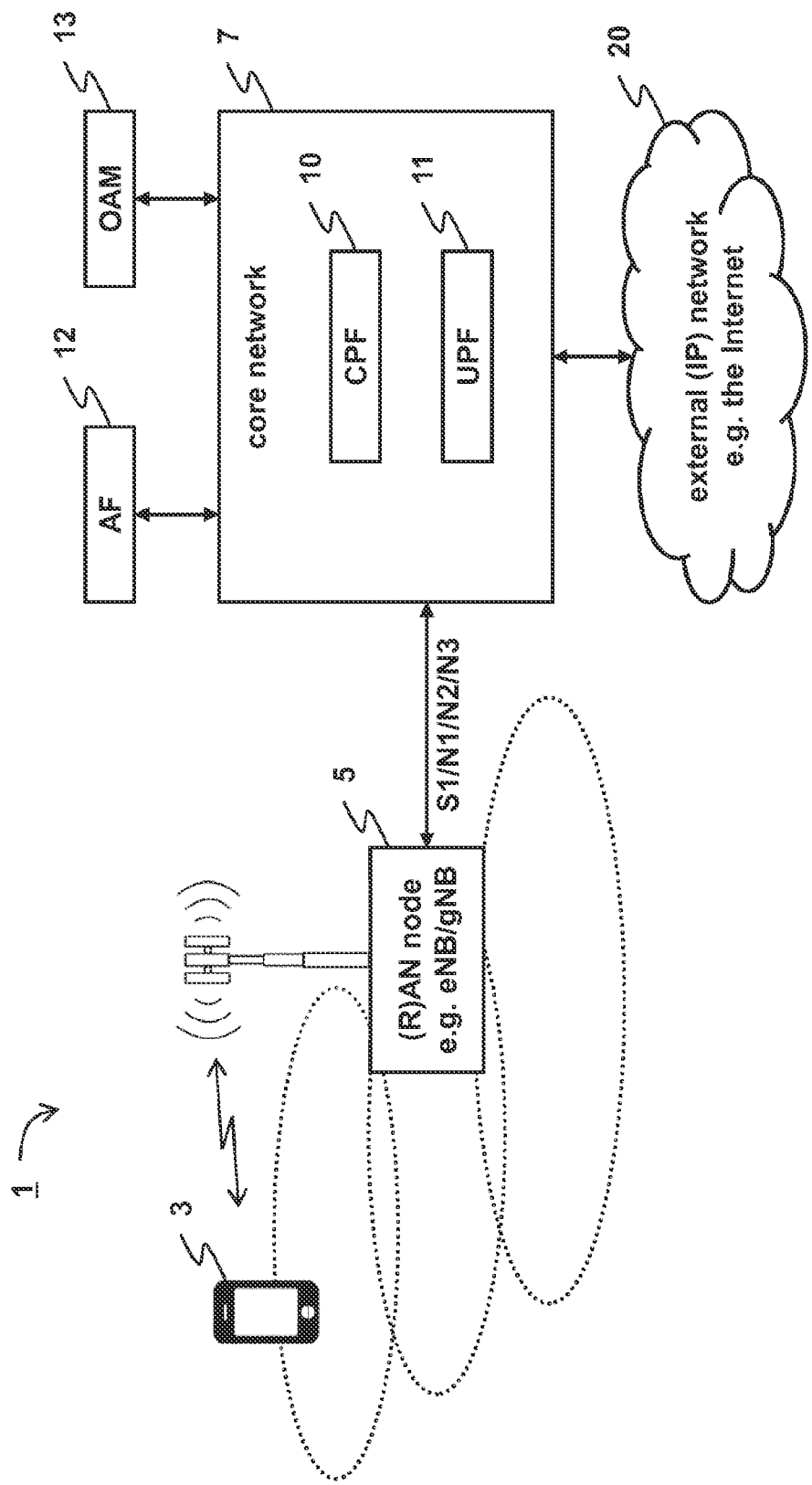
FIG. 1 illustrates schematically a generic mobile (cellular or wireless) telecommunication system to which embodiments of the invention may be applied.

Operations, Administration and Maintenance (OAM) systems manage network resource based on the network data and key performance indicators (KPIs), which measure quality and performance at the network level which may not necessarily be a reflection of the service quality at user or service application level. As a result, the user QoE could be inconsistent with the network KPIs and general performance. User QoE data could potentially be utilised by the OAM system to optimise network resources allocation. However, in order to achieve this there are number of issues that need to be carefully addressed based on the 5G system architecture including for example:

Which (entity/function/service) provides the network data and user data, and which (entity/function/service) collects/consumes these data?

Where would the data analytics be performed?

What is the relationship between core network, OAM and OTT service provider?

What are the corresponding procedures and information involved in the process?

Accordingly, embodiments of the present invention provide methods and associated apparatus that address or at least alleviate (at least some of) the above issues.

In an embodiment, the present invention provides a method performed by a network function providing data analytics services, the method comprising: performing data analytics based on user data for deriving a Quality of Experience (QoE) parameter for at least one user; and providing at least one of the result of said data analytics and said QoE analytics information to an Operations, Administration and Maintenance (OAM) management function.

In an embodiment, the present invention provides a method performed by an Operations, Administration and Maintenance (OAM) function providing management data analytics services, the method comprising: obtaining, from a network function providing data analytics services, the results of data analytics based on user data associated with at least one user; obtaining data relating to network performance associated with said at least one user; performing data analytics based on said data relating to said network performance and based on said results of data analytics from said network function for deriving at least one of: a Quality of Experience (QoE) parameter; a Key Performance Indicator (KPI); and a Quality of Service (QoS) parameter for said at least one user; and providing at least one of said QoE parameter, said KPI, and said QoS parameter to an OAM management function.

In an embodiment, the present invention provides a method performed by an Operations, Administration and Maintenance (OAM) management function, the method comprising: obtaining, from a function providing management data analytics services, at least one of: a Quality of Experience (QoE) parameter; a Key Performance Indicator (KPI); and a Quality of Service (QoS) parameter derived based on at least one of: user data associated with at least one user; and data relating to network performance associated with said at least one user; and adjusting network resource allocations for said at least one user in dependence on at least one of said QoE parameter, said KPI, and said QoS parameter.

In an embodiment, the present invention provides a network function providing data analytics services, the network function comprising: means for performing data analytics based on user data for deriving a Quality of Experience (QoE) parameter for said at least one user; and means for providing at least one of the result of said data analytics and said QoE parameter to an Operations, Administration and Maintenance (OAM) management function.

In an embodiment, the present invention provides an Operations, Administration and Maintenance (OAM) function providing management data analytics services, the OAM function comprising: means for obtaining, from a network function providing data analytics services, the results of data analytics based on user data associated with at least one user; means for obtaining data relating to network performance associated with said at least one user; means for performing data analytics based on said data relating to said network performance and based on said results of data analytics from said network function for deriving at least one of: a Quality of Experience (QoE) parameter; a Key Performance Indicator (KPI); and a Quality of Service (QoS) parameter for said at least one user; and means for providing at least one of said QoE parameter, said KPI, and said QoS to an OAM management function.

In an embodiment, the present invention provides an Operations, Administration and Maintenance (OAM) management function comprising: means for obtaining, from a function providing management data analytics services, at least one of: a Quality of Experience (QoE) parameter; a Key Performance Indicator (KPI); and a Quality of Service (QoS) parameter derived based on at least one of: user data associated with at least one user; and data relating to network performance associated with said at least one user; and means for adjusting network resource allocations for said at least one user in dependence on at least one of said QoE parameter, said KPI, and said QoS parameter.

In an embodiment, the present invention provides a network function providing data analytics services, the network function comprising a controller and a transceiver, wherein the controller is configured to: perform data analytics based on user data for deriving a Quality of Experience (QoE) parameter for said at least one user; and provide at least one of the result of said data analytics and said QoE parameter to an Operations, Administration and Maintenance (OAM) management function.

In an embodiment, the present invention provides an Operations, Administration and Maintenance (OAM) function providing management data analytics services, the OAM function comprising a controller and a transceiver, wherein the controller is configured to: obtain, from a network function providing data analytics services, the results of data analytics based on user data associated with at least one user; obtain data relating to network performance associated with said at least one user; perform data analytics based on said data relating to said network performance and based on said results of data analytics from said network function for deriving at least one of: a Quality of Experience (QoE) parameter; a Key Performance Indicator (KPI); and a Quality of Service (QoS) parameter for said at least one user; and provide at least one of said QoE parameter, said KPI, and said QoS to an OAM management function.

In an embodiment, the present invention provides an Operations, Administration and Maintenance (OAM) management function comprising a controller and a transceiver, wherein the controller is configured to: obtain, from a function providing management data analytics services, at least one of: a Quality of Experience (QoE) parameter; a Key Performance Indicator (KPI); and a Quality of Service (QoS) parameter derived based on at least one of: user data associated with at least one user; and data relating to network performance associated with said at least one user; and adjust network resource allocations for said at least one user in dependence on at least one of said QoE parameter, said KPI, and said QoS parameter.

Embodiments of the invention extend to corresponding systems and computer program products such as computer readable storage media having instructions stored thereon which are operable to program a programmable processor to carry out a method as described in the embodiments and possibilities set out above or below and/or to program a suitably adapted computer to provide the apparatus according to an embodiment of the present invention.

Each feature disclosed in this specification (which term includes the claims) and/or shown in the drawings may be incorporated in an embodiment of the invention independently of (or in combination with) any other disclosed and/or illustrated features.

FIG. 1 schematically illustrates a mobile (cellular or wireless) telecommunication system 1 to which the above embodiments are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 1 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports NextGeneration/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) 10 and user plane functions (UPFs) 11. For example, the core network 7 may include, amongst others, a Network Data Analytics Function (NWDAF). In this example, the core network 7 is coupled to at least one application function (AF) 12 (e.g. via the Internet) and an Operations, Administration and Maintenance (OAM) function 13 (via an appropriate interface). The OAM may also include a Management Data Analytics Service (MDAS) function, where appropriate. It will also be appreciated that in some systems at least a part of the OAM functionality may be provided in the core network 7. From the core network 7, connection to an external IP network 20 (such as the Internet) is also provided.

The components of this system 1 are configured to perform data analytics for network automation utilising user QoE data, by one or more of the following:
- a core network based approach, in which the core network 7 (e.g. NWDAF) collects and analyses both user data and network data;
- an OAM based approach, in which the OAM 13 (e.g. MDAS) collects and analyses both user data and network data;
- a first hybrid approach, in which the core network 7 collects and analyses user data and the OAM 13 collects and analyses core network's analytical results and network data; and
- a second hybrid approach, in which the core network 7 collects and analyses user data and part of network data, and the OAM 13 collects and analyses the core network's analytical results and network data collected by the OAM 13 itself.

User Equipment (UE)

Figure 2:
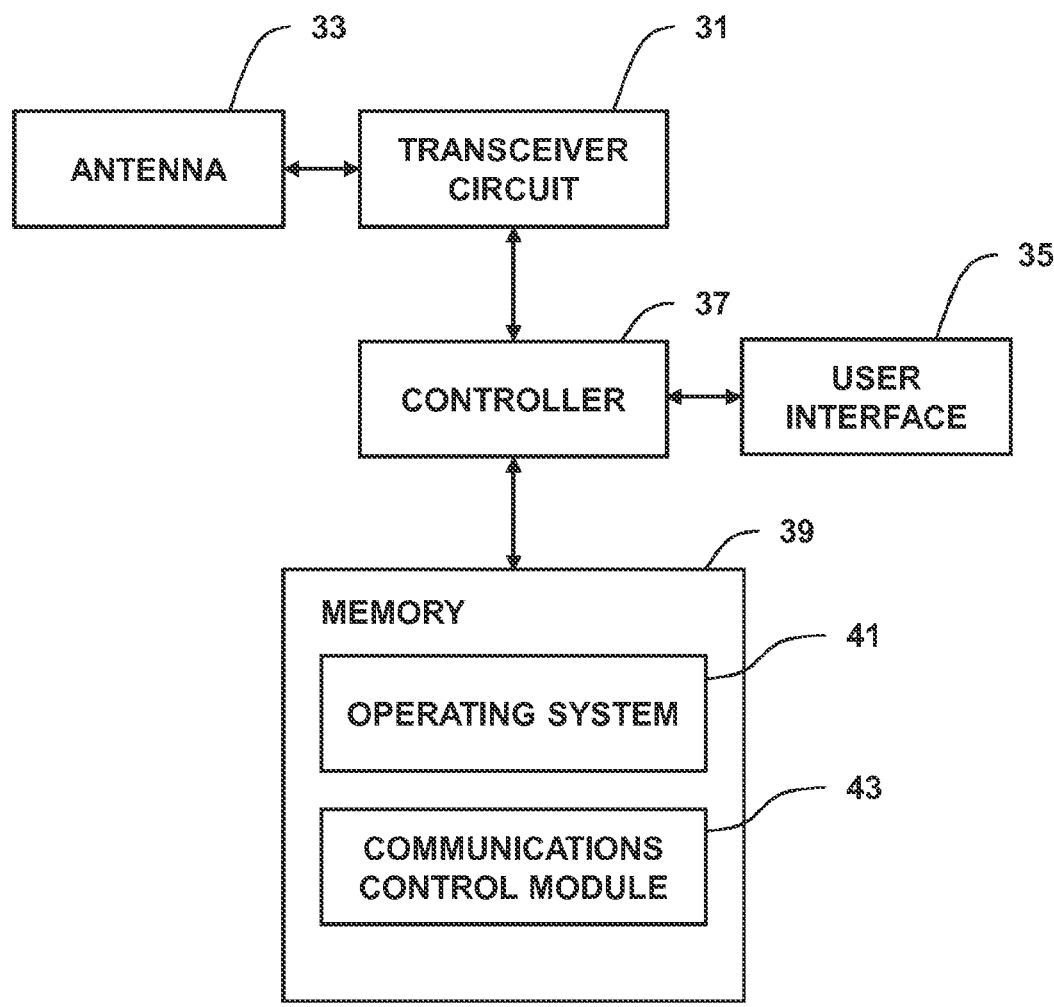
FIG. 2 is a schematic block diagram of a mobile device (user equipment) forming part of the system shown in FIG. 1.

FIG. 2 is a block diagram illustrating the main components of the UE (mobile device 3) shown in FIG. 1. As shown, the UE includes a transceiver circuit 31 which is operable to transmit signals to and to receive signals from the connected node(s) via one or more antenna 33. Although not necessarily shown in FIG. 2, the UE will of course have all the usual functionality of a conventional mobile device (such as a user interface 35) and this may be provided by any one or any combination of hardware, software and firmware, as appropriate. A controller 37 controls the operation of the UE in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/sending/receiving) signalling messages and uplink/downlink data packets between the UE 3 and other nodes, including (R)AN nodes 5 and core network nodes.

(R)AN node

Figure 3:
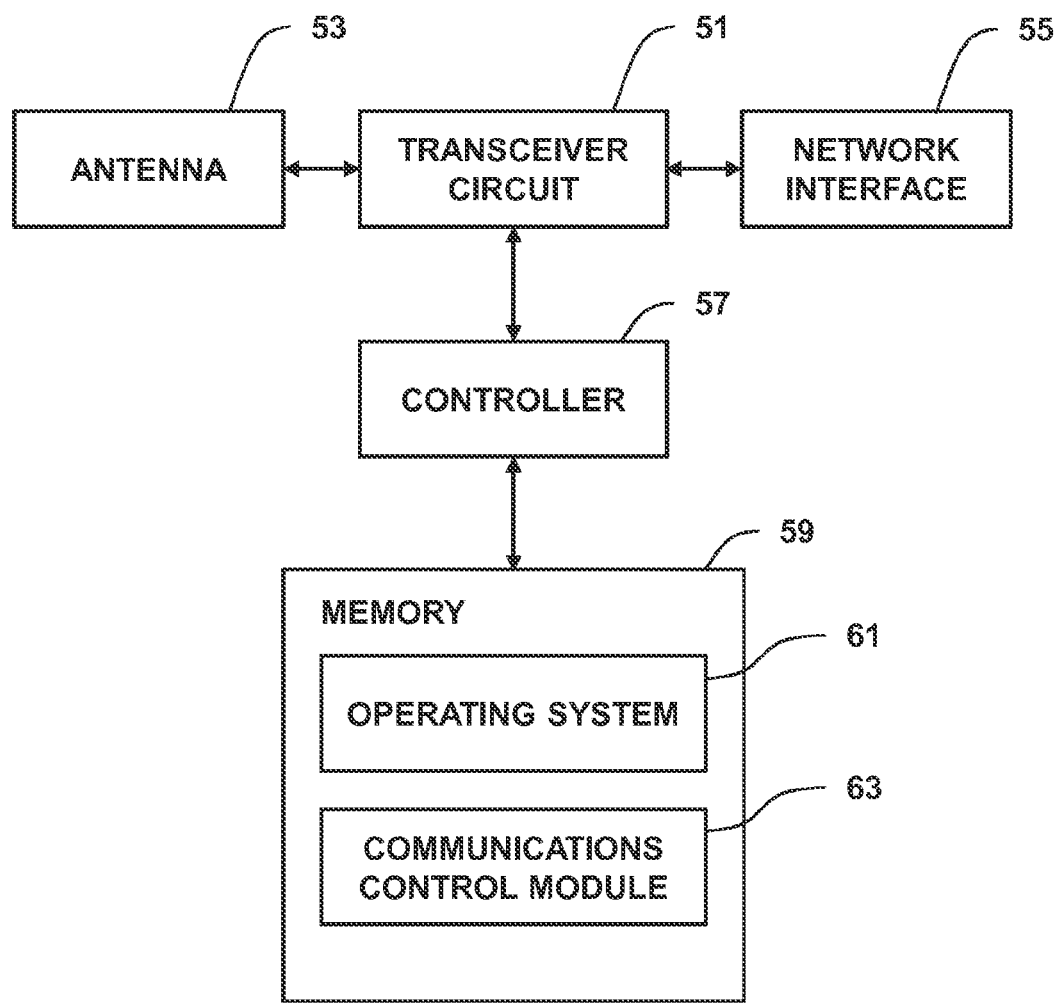
FIG. 3 is a schematic block diagram of a base station apparatus forming part of the system shown in FIG. 1.

FIG. 3 is a block diagram illustrating the main components of an exemplary (R)AN node 5 (base station) shown in FIG. 1. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N1/N2/N3). A controller 57 controls the operation of the (R)AN node 5 in accordance with software stored in a memory 59. The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signalling between the (R)AN node 5 and other nodes, such as the UE 3 and the core network nodes/OAM 13.

Core Network/OAM Node

Figure 4:
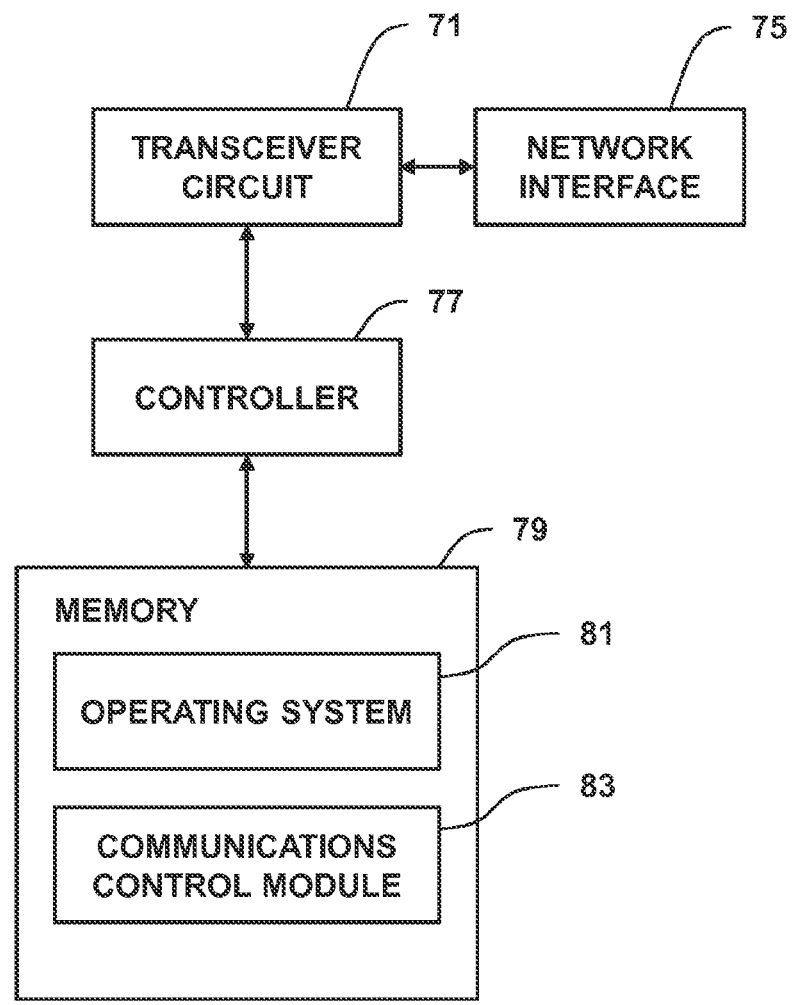
FIG. 4 is a schematic block diagram of a generic core network node forming part of the system shown in FIG. 1.
Figure 5:
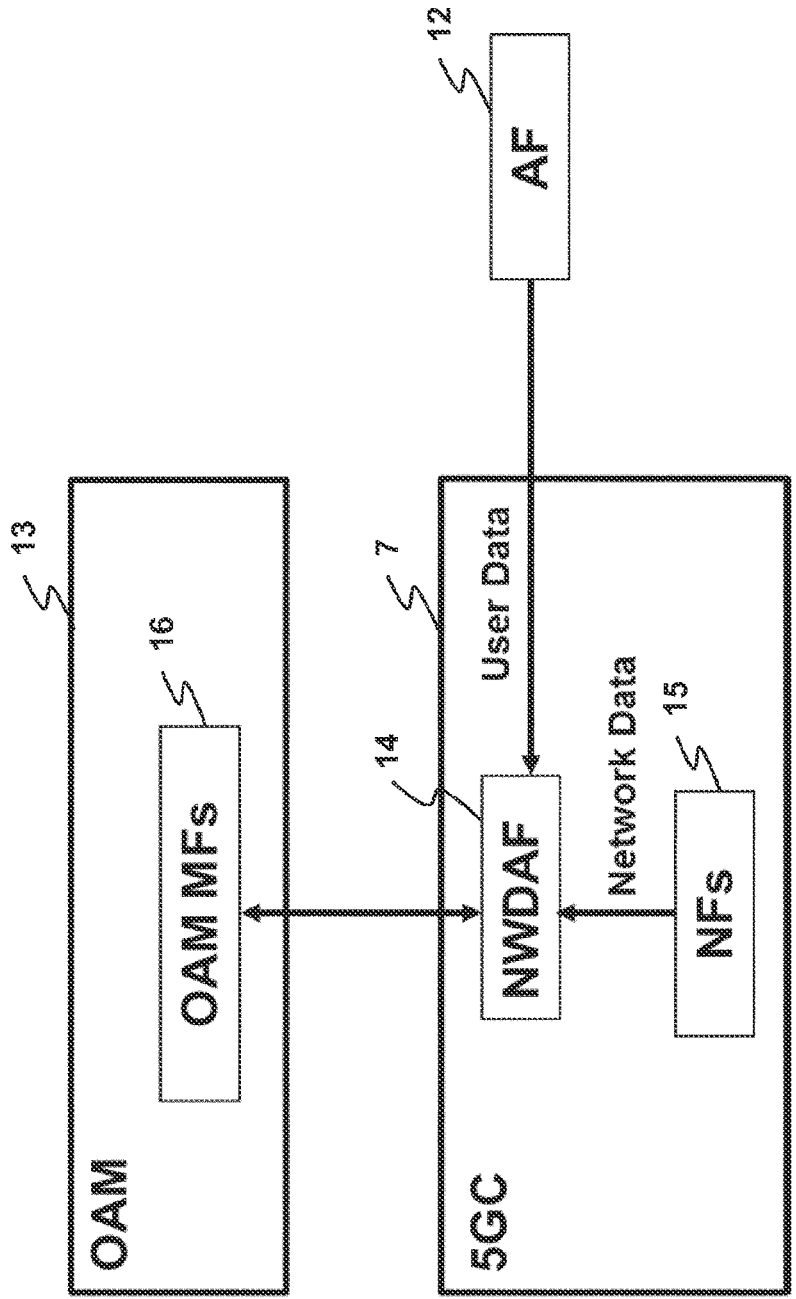
FIGS. 5 to 18 illustrate schematically some exemplary ways in which embodiments of the present invention may be implemented in the system shown in FIG. 1.
Figure 11:
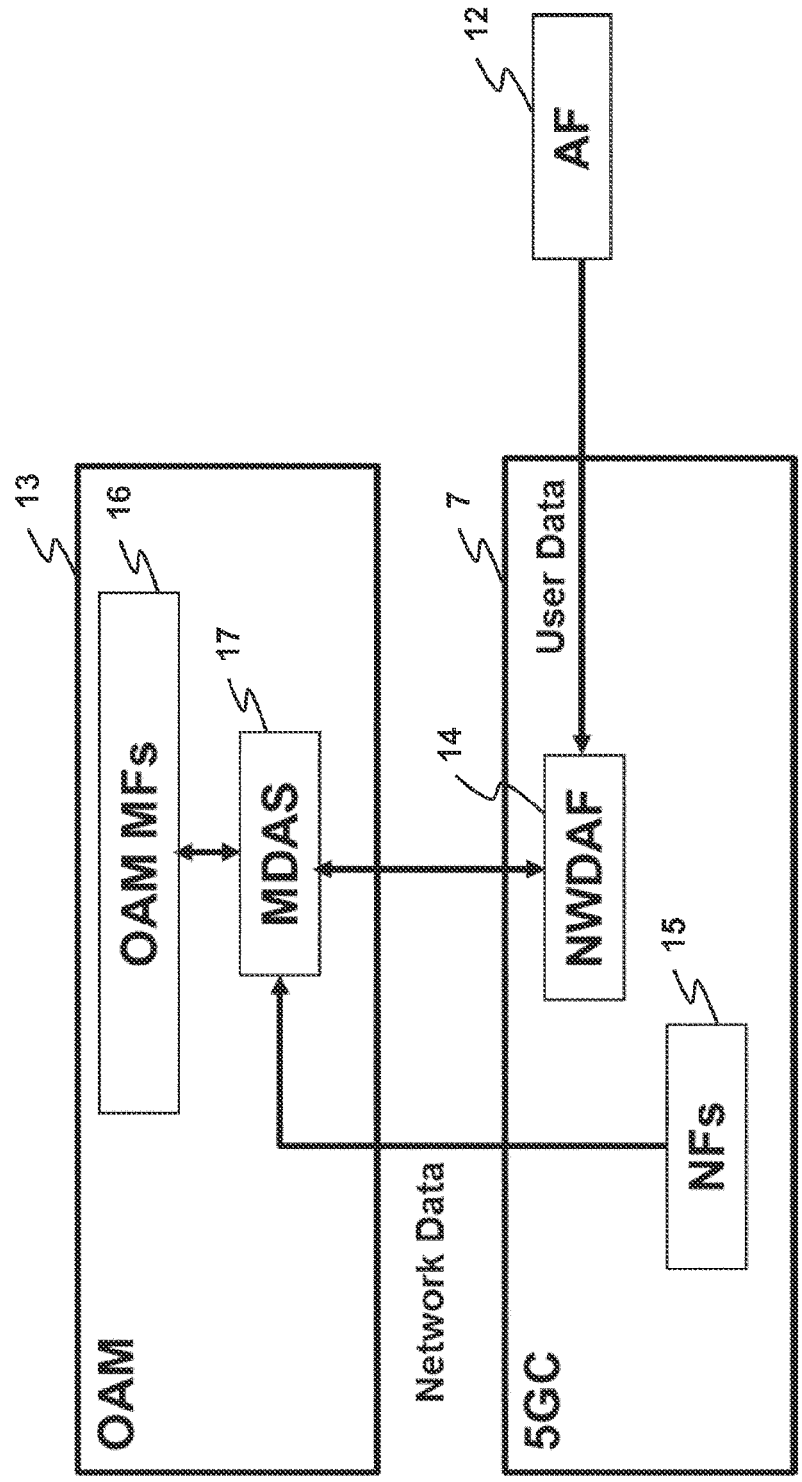
Figure 15:
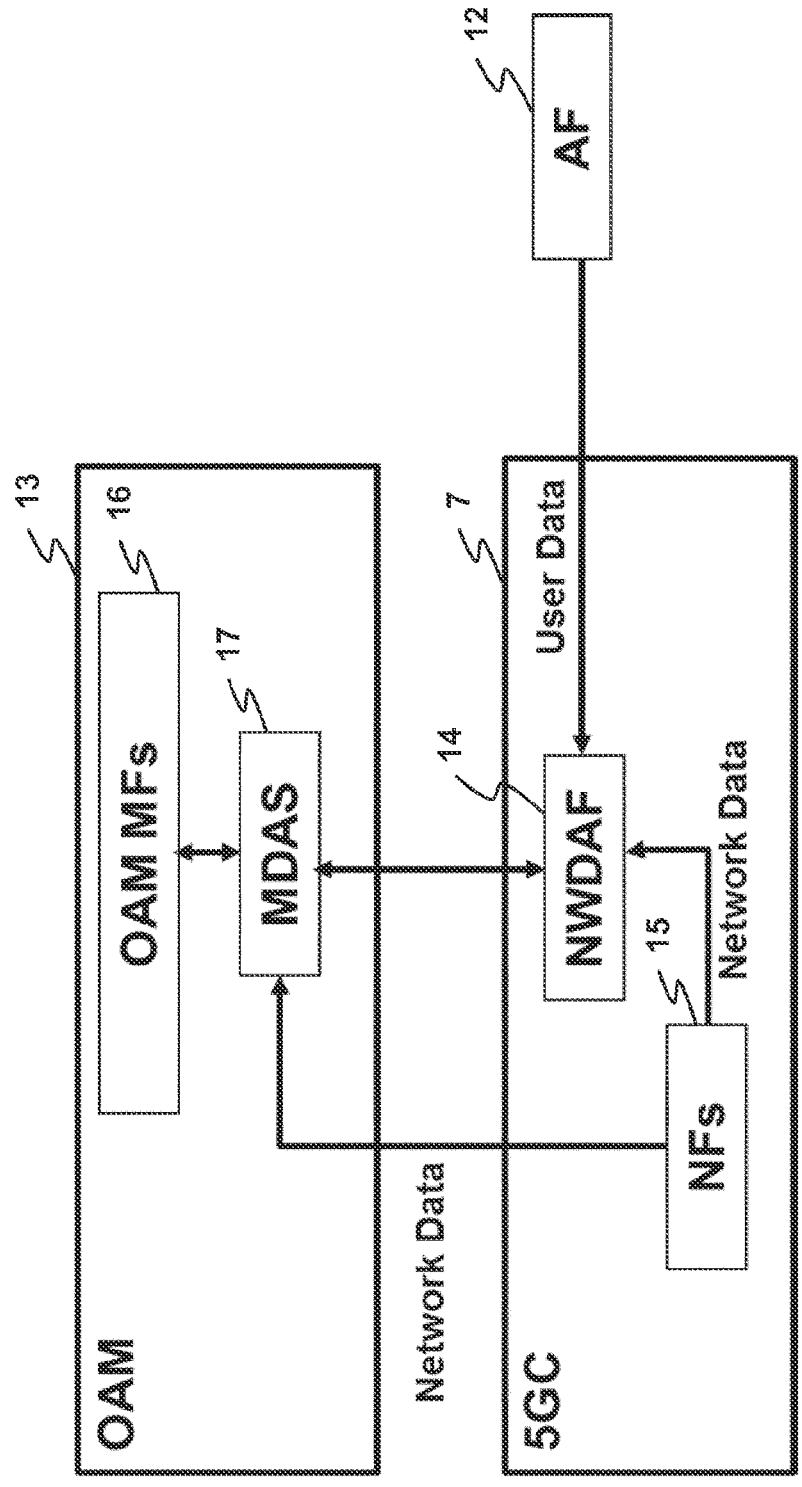

FIG. 4 is a block diagram illustrating the main components of a generic core network node (or function), for example, the CPF 10, the UPF 11 shown in FIG. 1, or the NWDAF 14 shown in e.g. FIGS. 5, 11, and 15. It will be appreciated that the same block diagram may be applicable to the AF 12 and/or the nodes of the OAM 13 as well (such as the MDAS 17 shown in e.g. FIGS. 8, 11, and 15). As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and at least a communications control module 83. The communications control module 83 is responsible for handling (generating/sending/receiving) signaling between the core network node and other nodes, such as the UE 3, (R)AN node 5, the AF 12, the OAM 13, and other core network nodes. Such signaling includes appropriately formatted requests and responses relating to data analytics for network automation.

In order to address the aforementioned problems, embodiments of the present invention provide multiple solutions in order to optimize the network performance based on the data analytics based on both user and network data under different deployment/implementation scenarios. User data can contain QoE-related information (e.g. a mean opinion score (MOS)).

Four embodiments presented herein include:
Embodiment 1: Core network based approach, in which core network collects and analyses both user data and network data,
Embodiment 2: OAM based approach, in which OAM collects and analyses both user data and network data,
Embodiment 3: Hybrid approach I, in which core network collects and analyses user data, and OAM collects and analyses core network's analytical results and network data,
Embodiment 4: Hybrid approach II, in which core network collects and analyses user data and part of network data, and OAM collects and analyses core network's analytical results and part of network data collected by the OAM itself.

In Embodiment 1, procedures have been proposed for two sub-scenarios:
OAM MF(s) is NWDAF's service consumer
AF is a service consumer of both NWDAF and OAM MF(s) services In Embodiment 2, procedures have been proposed for two sub-scenarios:
  OAM MF(s) is a service consumer of MDAS's
  AF is a service consumer of both MDAS and OAM MF(s) services In Embodiment 3, procedures have been proposed for three sub-scenarios:
  MDAS is NWDAF's service consumer and OAM MF(s) is MDAS's service consumer
  AF is NWDAF's service consumer and OAM MF(s) is MDAS's service consumer
  MDAS is NWDAF's service consumer, and AF and OAM MF(s) are MDAS's service consumers In Embodiment 4, procedures have been proposed for three sub-scenarios:
  MDAS is NWDAF's service consumer and OAM MF(s) is MDAS's service consumer
  AF is NWDAF's service consumer and OAM MF(s) is MDAS's service consumer
  MDAS is NWDAF's service consumer, and AF and OAM MF(s) are MDAS's service consumers Embodiment 1: Core Network Based Approach, in Which Core Network Collects and Analyses Both User Data and Network Data FIG. 5 is a schematic overview of the so-called core network based approach, in which (a function in) the core network 7 collects and analyses both user data and network data. FIG. 5 highlights the relation among the OAM MFs 16, the NWDAF 14, the NFs 15 (in the core network 7), and the AF 12 for the core network based approach.

The term 'OAM MF' refers to any function that provides OAM services at network functional level, slicing, end user and/or network service. For example the OAM system 13 may include logical functions or entities to provide network function management services (e.g. NFMF), network slice management services (e.g. NSMF) and network slice subnet management services (e.g. NSSMF). These MFs may also be referred to by other names. The OAM system 13 may also include function(s) to provide management data analytics services, referred here as the MDAS 17. The MDAS 17 is a logical function and may be referred to by other relevant names.

1. The AF 12 provides user data to the NWDAF 14,
2. The core network NF 15 (or NFs) provides network data to the NWDAF 14,
3. The NWDAF 14 performs data analytics based on the collected data, and the analytical results may include parameters, at least one of user QoE analytical results and network QoS/KPIs analytical results.
4. The analytical results will be provided to either or both the OAM MFs 16 and/or the AF 12 based on the scenarios,
5. The OAM MFs 16 will adjust network resource allocation if needed based on either or both the analytical results from the NWDAF 14 and/or the request from the AF 12.

Figure 6:
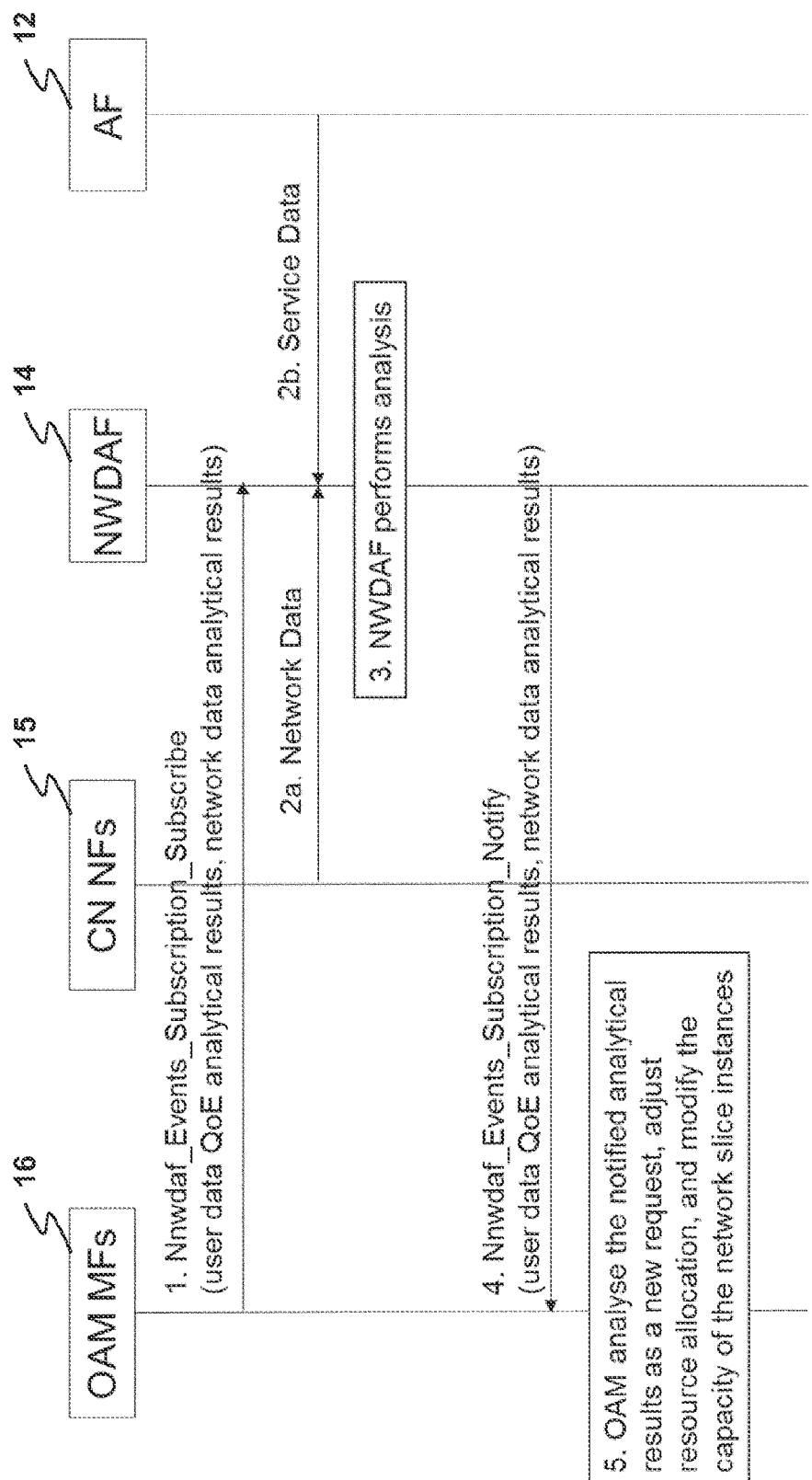

Scenario 1.1 OAM MF(s) is NWDAF's Service Consumer
FIG. 6 illustrates schematically an exemplary procedure for the scenario in which the OAM MF(s) 16 is the NWDAF's 14 service consumer using the core network based approach.

1. An OAM MF 16 subscribes to the NWDAF's 14 service by sending a Nnwdaf_ Events_Subscription_ Subscribe message or any other service procedure or message suitable for the purpose of subscribing to analytics and/or statistics information from the NWDAF 14.
2. The AF 12 provides user data and the core network NF 15 (or NFs) provides network data to the NWDAF 14. If the AF 12 is trusted by the network operator, the AF 12 can send data to the NWDAF 14 directly; if the AF 12 is untrusted by the network operator, the AF 12 will be connected to the NWDAF 14 via a NEF (not shown).
3. The NWDAF 14 performs data analytics based on the collected user data and network data, and the analytical results may include parameters, at least one of user QoE analytical results and network QoS/KPIs analytical results. User QoE analytical result is the satisfactory score of users, and it can be a range of numbers, a percentage or a range of grades. QoS analytical results can be delay, jitter, throughput, or other kind of relevant QoS parameters.
4. The NWDAF 14 notifies the OAM MFs 16 with its analytics result information by sending a Nnwdaf_Analytics_Info_Response message or any other service procedure or message suitable for the purpose of notifying analytics and/or statistics information from the NWDAF 14 which may include parameters at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of relevant QoS parameters. One of the OAM MFs 16 can be the MDAS 17.
5. The OAM MF(s) 16 analyses the notified analytical results from the NWDAF 14 and creates an appropriate action by for example sending a new request to modify the capacity of the network slice instances. After analysing the request and if needed, the OAM MF(s) 16 will identify the related network slice(s), derive new network requirements, and initiates modification of the capacity of identified network slice(s) (e.g. change NF(s) 15 or increase the number of related NFs 15 in the identified network slice(s)). It can also modify an existing NSI by adopting OAM Network Slice Configuration service or any other dedicated service or procedure for the purpose. The action by the OAM MF(s) 16 could be conducted at the constituents, i.e., network slice subnets and/or at the constituent NFs 15 of the network slice.

The QoS analytical results can be QoS flow-related data, such as QoS flow Bit Rate, QoS flow Packet Delay, QoS flow packet Error Rate, and whole network-related data, such as Registered Subscribers of network and network Slice Instance, End-to-end Latency of 5G Network, Downlink latency in gNB, Upstream Throughput for Network and Network Slice Instance, Downstream Throughput for Single Network Slice Instance, Upstream Throughput at N3 interface, Downstream Throughput at N3 interface, Number of PDU sessions of network and network Slice Instance, Virtualised Resource Utilization of Network Slice Instance.

Figure 7:
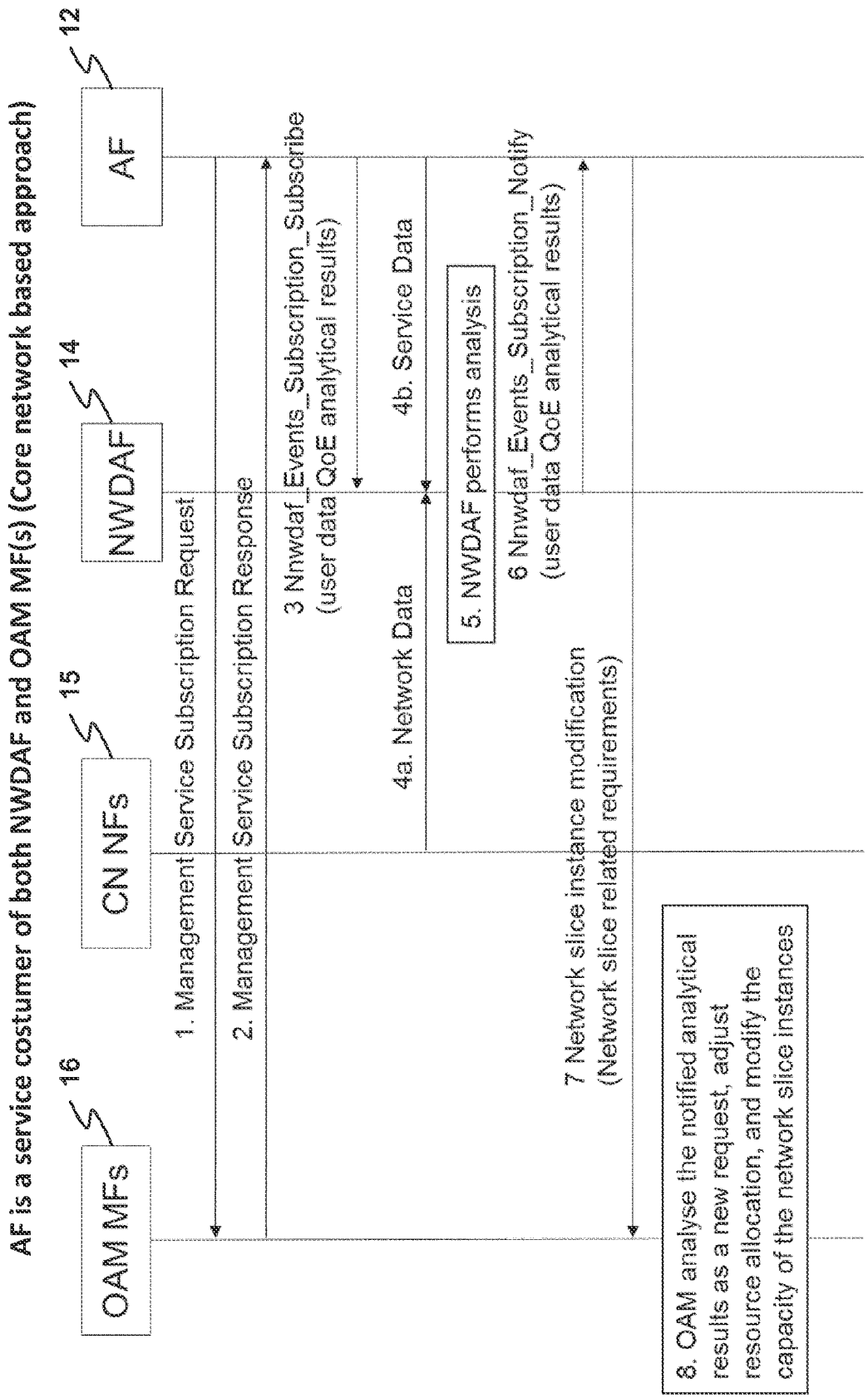

Scenario 1.2 AF is a Service Consumer of Both NWDAF and OAM MF(s)
FIG. 7 illustrates schematically an exemplary procedure for the scenario in which an AF 12 is a service consumer of both the NWDAF 14 and the OAM MF(s) 16 using the core network based approach.

1. The AF 12 requests notifications from the OAM MF(s) 16 on changes in the analytics information by invoking a Management Service Subscription Request. The message may include parameters; at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.

2. The OAM MF(s) 16 acknowledges the AF's 12 Subscription Request via a Management Service Subscription Response message.
3. An AF 12 subscribes to one or more service by the NWDAF 14 by sending a Nnwdaf_Events_Subscription_Subscribe message or any other service procedure or message suitable for the purpose of subscribing analytics and/or statistics information from the NWDAF 14.
4. The AF 12 provides user data and the core network NF 15 (or NFs) provides network data to the NWDAF 14. If the AF 12 is trusted by the network operator, the AF 12 can send data to the NWDAF 14 directly; if the AF 12 is untrusted by the network operator, the AF 12 will be connected to the NWDAF 14 via a NEF (not shown).
5. The NWDAF 14 performs data analytics based on the collected user data and network data, and the analytical results may include parameters, at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of relevant QoS parameters.
6. The NWDAF 14 notifies the AF 12 with its analytics result information by sending a Nnwdaf_Events_Subscription_Notify message or any other service procedure or message suitable for the purpose of notifying analytics and/or statistics information from the NWDAF 14 which may include parameters at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters. One of the OAM MFs 16 can be the MDAS 17.
7. The AF 12 analyses the notified analytical results. If the results(s) are unsatisfied, the AF 12 will request the OAM 13 via sending a Network slice instance modification message or any other service procedure or message suitable for the purpose of to changing the network capacity for its service.
8. The OAM MF(s) 16 analyses the AF's 12 request to modify the capacity of the network slice instances. After analysing the request, if it is needed, the OAM MF(s) 16 will identify the related network slice(s), derive new network requirements, and initiates modification of the capacity of identified network slice(s) (e.g. change NF(s) 15 and/or increase the number of related NFs 15 in the identified network slice(s)). It also can modify an existing NSI by using NetworkSliceConfiguration service. The action by the OAM MF(s) 16 could be conducted at the constituent network slice subnets and/or at the constituent NFs 15 level of network slice.

The QoS analytical results can be QoS flow-related data, such as QoS flow Bit Rate, QoS flow Packet Delay, QoS flow packet Error Rate, and whole network-related data, such as Registered Subscribers of network and network Slice Instance, End-to-end Latency of 5G Network, Downlink latency in gNB, Upstream Throughput for Network and Network Slice Instance, Downstream Throughput for Single Network Slice Instance, Upstream Throughput at N3 interface, Downstream Throughput at N3 interface, Number of PDU sessions of network and network Slice Instance, Virtualised Resource Utilization of Network Slice Instance.

Figure 8:
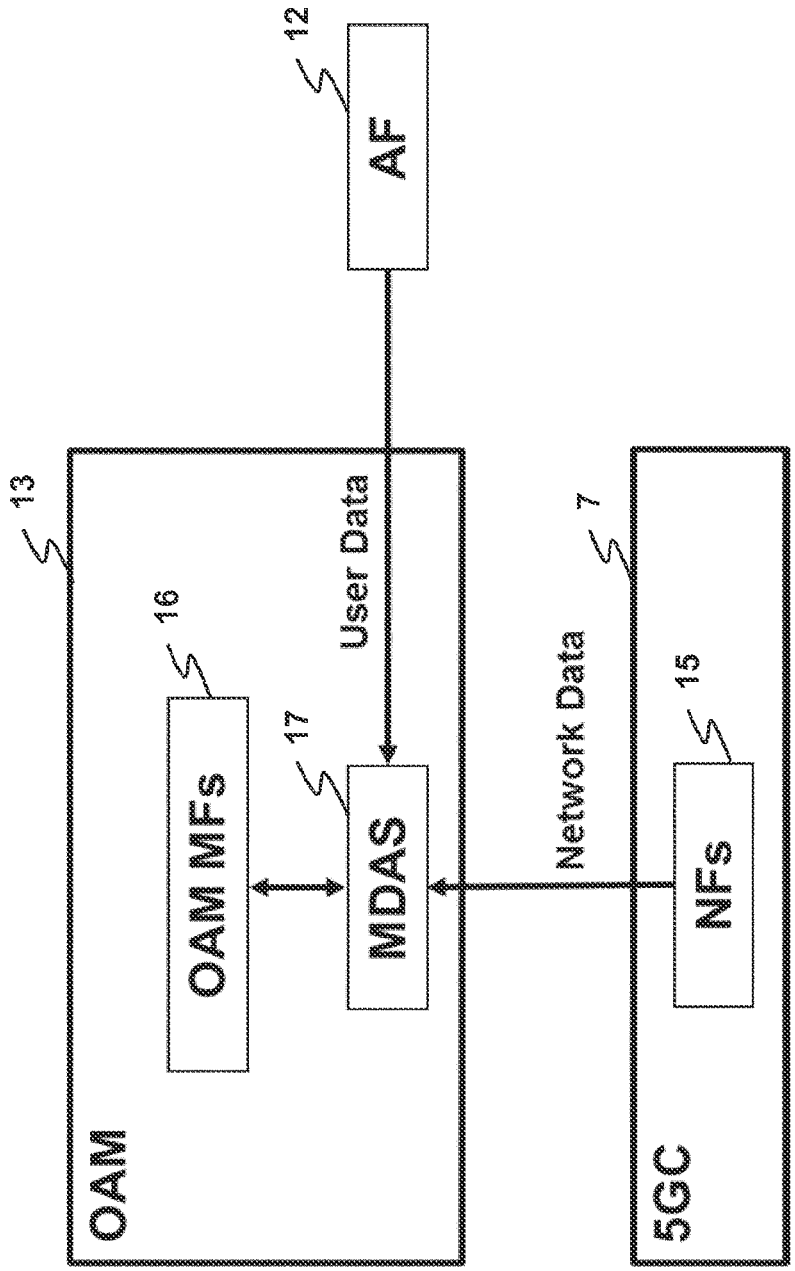

Embodiment 2: OAM Based Approach, in Which OAM Collects and Analyses Both User Data and Network Data FIG. 8 is a schematic overview of the so-called OAM based approach, in which (a function in) the OAM 13 collects and analyses both user data and network data. This approach will be described in detail with reference to FIGS. 9 and 10. FIG. 8 highlights the relation among the OAM MFs 16, the NWDAF 14, the NFs 15, and the AF 12 for the OAM based approach.

The term 'OAM MF' refers to any function that provides OAM services at network functional level, slicing, end user and/or network service. For example the OAM system 13 may include logical functions or entities to provide network function management services (e.g. NFMF), network slice management services (e.g. NSMF) and network slice subnet management services (e.g. NSSMF). These MFs may also be referred to by other names. The OAM system 13 may also include function(s) to provide management data analytics services, referred here as the MDAS 17. The MDAS 17 is a logical function and may be referred to by other relevant names.

1. The AF 12 provides user data to the MDAS 17.
2. The core network NF 15 (or NFs) provides network data to the OAM 13/MDAS 17.
3. The OAM 13/MDAS 17 performs data analytics based on the collected data, and the analytical results may include parameters, at least one of user QoE analytical result and network QoS/KPIs analytical results.
4. The analytical results will be provided to either the OAM MFs 15 or the AF 12 based on the scenarios.
5. The OAM MFs 16 will adjust network resource allocation if needed based on either the analytical results from the MDAS 17 or the request from the AF 12.

Scenario 2.1 OAM MF(s) is MDAS's Service Consumer

Figure 9:
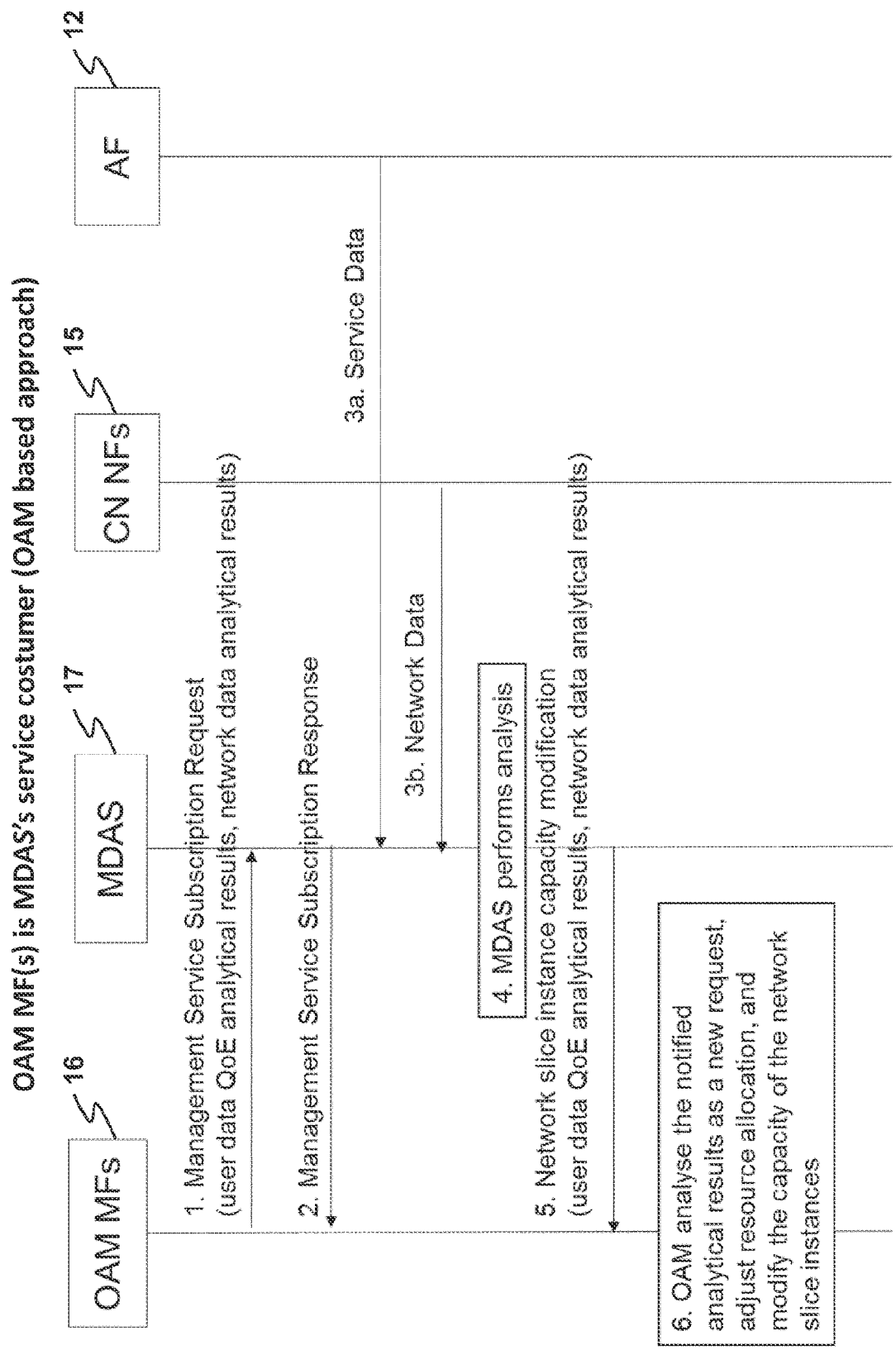

FIG. 9 illustrates schematically an exemplary procedure for the scenario in which the OAM MF(s) 16 is the MDAS's service consumer using the OAM based approach.

1. The OAM MF(s) 16 requests notifications from the MDAS 17 on changes in the analytics information by invoking a Management Service Subscription Request. The message may include parameters; at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.
2. The MDAS 17 acknowledges the OAM MF(s)' 16 Subscription Request via a Management Service Subscription Response message.
3. The AF 12 provides user data and the core network NF 15 (or NFs) provides network data to the MDAS 17. If the AF 12 is trusted by the network operator, the AF 12 can send data to the MDAS 17 directly; if the AF 12 is untrusted by the network operator, the AF 12 will be connected to the MDAS 17 via a NEF (not shown).

4. The MDAS 17 performs data analytics based on the collected user data and network data, and the analytical results may include parameters, at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.

5. The MDAS 17 notifies the OAM MF(s) 16 with its analytics result information by sending a Network slice instance capacity modification or any other service procedure or message suitable for the purpose of notifying analytics and/or statistics information from the NWDAF 14 which may include parameters at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.

6. The OAM MF(s) 16 analyses the notified analytical results from the MDAS 17 as a new request to modify the capacity of the network slice instances. After analysing the request, if it is needed, the OAM MF(s) 16 will identify the related network slice(s), derive new network requirements, and initiates modification of the capacity of identified network slice(s) (e.g. increase the number of related NFs in the identified network slice(s)). It also can modify an existing NSI by using Network Slice Configuration service or any other dedicated service or procedure for the purpose. The action by the OAM MF(s) 16 could be conducted at the constituents, i.e., network slice subnets and/or at the constituent NFs 15 of network slice.

The QoS analytical results can be QoS flow-related data, such as QoS flow Bit Rate, QoS flow Packet Delay, QoS flow packet Error Rate, and whole network-related data, such as Registered Subscribers of network and network Slice Instance, End-to-end Latency of 5G Network, Downlink latency in gNB, Upstream Throughput for Network and Network Slice Instance, Downstream Throughput for Single Network Slice Instance, Upstream Throughput at N3 interface, Downstream Throughput at N3 interface, Number of PDU sessions of network and network Slice Instance, Virtualised Resource Utilization of Network Slice Instance.

Scenario 2.2 AF is the Service Consumer of Both MDAS and OAM MF(s)

Figure 10:
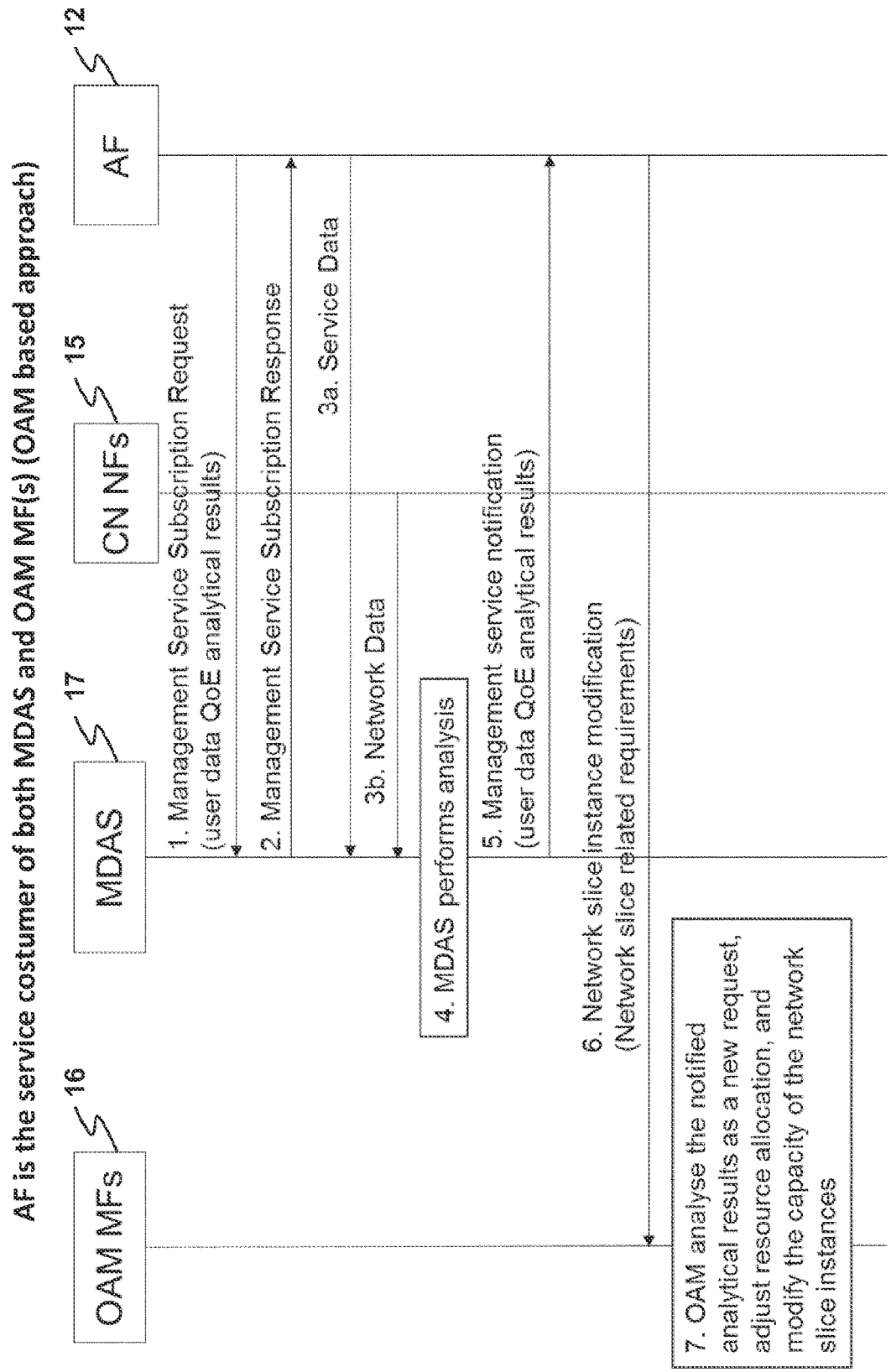

FIG. 10 illustrates schematically an exemplary procedure for the scenario in which an AF 12 is the service consumer of both the MDAS 17 and the OAM MF(s) 16 using the OAM based approach.

1. The AF 12 requests notifications from the MDAS 17 on changes in the analytics information by invoking a Management Service Subscription Request. The message may include parameters; at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.

2. The MDAS 17 acknowledges the AF's 12 Subscription Request via a Management Service Subscription Response message.

3. The AF 12 provides user data and the core network NF 15 (or NFs) provides network data to the MDAS 17. If the AF 12 is trusted by the network operator, the AF 12 can send data to the MDAS 17 directly; if the AF 12 is untrusted by the network operator, the AF 12 will be connected to the MDAS 17 via a NEF (not shown).

4. The MDAS 17 performs data analytics based on the collected user data and network data, and the analytical results may include parameters, at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.

5. The MDAS 17 notifies the AF 12 with its analytics result information by sending a Management service notification message or any other service procedure or message suitable for the purpose of notifying analytics and/or statistics information from the MDAS 17 which may include parameters at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters. One of the OAM MFs 16 can be the MDAS 17.

6. The AF 12 analyses the notified analytical results. If the results(s) are unsatisfied, the AF 12 requests the OAM 13 via sending a Network slice instance modification message or any other service procedure or message suitable for the purpose of to changing the network capacity for its service.

7. The OAM MF(s) 16 analyses the AF's 12 request to modify the capacity of the network slice instances. After analysing the request, if it is needed, the OAM MF(s) 16 will identify the related network slice(s), derive new network requirements, and initiates modification of the capacity of identified network slice(s) (e.g. increase the number of related NFs 15 in the identified network slice(s)). It also can modify an existing NSI by using Network Slice Configuration service or any other dedicated service or procedure for the purpose. The action by the OAM MF(s) 16 could be conducted at the constituents, i.e., network slice subnets and/or at the constituent NFs 15 of network slice.

The QoS analytical results can be QoS flow-related data, such as QoS flow Bit Rate, QoS flow Packet Delay, QoS flow packet Error Rate, and whole network-related data, such as Registered Subscribers of network and network Slice Instance, End-to-end Latency of 5G Network, Downlink latency in gNB, Upstream Throughput for Network and Network Slice Instance, Downstream Throughput for Single Network Slice Instance, Upstream Throughput at N3 interface, Downstream Throughput at N3 interface, Number of PDU sessions of network and network Slice Instance, Virtualised Resource Utilization of Network Slice Instance.

Embodiment 3: Hybrid Approach I, in Which Core Network Collects and Analyses User Data, and OAM Collects and Analyses Core Network's Analytical Results and Network Data FIG. 11 is a schematic overview of the so-called Hybrid approach I, in which (a function in) the core network 7 collects and analyses user data and (a function in) the OAM 13 collects and analyses the core network's analytical results/network data. This approach will be described in detail with reference to FIGS. 12 to 14. FIG. 11 highlights the relation among the OAM MFs 16, the NWDAF 14, the NFs 15, and the AF 12 for Hybrid approach I.

The term 'OAM MF' refers to any function that provides OAM services at network functional level, slicing, end user and/or network service. For example the OAM system 13 may include logical functions or entities to provide network function management services (e.g. NFMF), network slice management services (e.g. NSMF) and network slice subnet management services (e.g. NSSMF). These MFs may also be referred to by other names. The OAM system 13 may also include function(s) to provide management data analytics services, referred here as the MDAS 17. The MDAS 17 is a logical function and may be referred to by other relevant names.

1. The AF 12 provides user data to the NWDAF 14.
2. The core network NF 15 (or NFs) provides network data to the MDAS 17.
3. The NWDAF 14 performs data analytics based on the collected user service data, and provides the analytical results to either the MDAS 17 or the AF 12 based on the scenarios. The analytical results may include parameters, at least one of user QoE analytical result.
4. The OAM 13/MDAS 17 performs data analytics based on the collected network data, and the analytical results from the NWDAF 14, which is based on user service data. The MDAS 17 provides its analytical results to the OAM MFs 16. Its analytical results may include parameters, at least one of combined user QoE analytical result and network QoS/KPIs analytical results.
5. The OAM MFs 16 will adjust network resource allocation if needed based on the analytical results from the MDAS 17 and/or a request from the AF 12.

Figure 12:
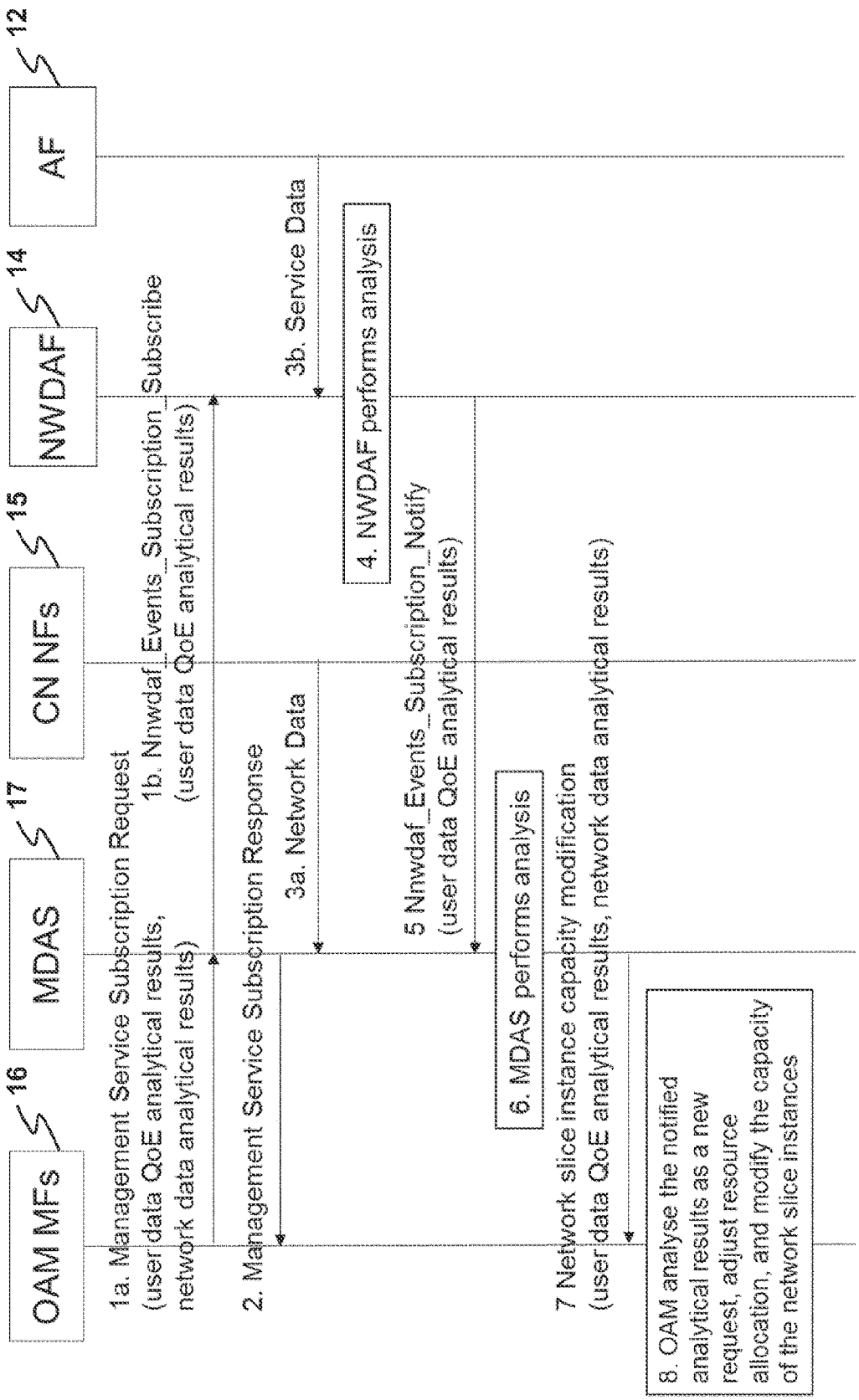

Scenario 3.1 MDAS is NWDAF's service consumer and OAM MF(s) is MDAS's Service Consumer FIG. 12 illustrates schematically an exemplary procedure for the scenario in which the MDAS 17 is NWDAF's 14 service consumer and the OAM MF(s) 16 is/are the MDAS's service consumer using Hybrid approach I.

1. The OAM MF(s) 16 request notifications from the MDAS 17 on changes in the analytics information by invoking a Management Service Subscription Request. The message may include parameters; at least one of user QoE analytical result and network QoS/KPI analytical results. User QoE analytical result is the satisfactory score of users, and it can be a range of numbers, a percentage or a range of grades. QoS analytical results can be delay, jitter, throughput, or other kinds of QoS parameters.

The MDAS 17 subscribes to the NWDAF's 14 service by sending a Nnwdaf_Events_Subscription_Subscribe message or any other service procedure or message for the purpose of subscribing analytics and/or statistics information from the NWDAF 14.

2. The OAM MF(s) 16 acknowledges the MDAS's 17 Subscription Request via a Management Service Subscription Response message.
3. The AF 12 provides user data ('service data' in FIG. 12) to the NWDAF 14 and the core network NF 15 (or NFs) provides network data to the MDAS 17. If the AF 12 is trusted by the network operator, the AF 12 can send data to the NWDAF 14 directly; if the AF 12 is untrusted by the network operator, the AF 12 will be connected to the NWDAF 14 via a NEF (not shown).
4. The NWDAF 14 performs data analytics based on the collected user data, and the analytical results may include parameters, at least one of user QoE analytical result. User QoE analytical result is the satisfactory score of users, and it can be a range of numbers, a percentage or a range of grades.
5. The NWDAF 14 notifies the MDAS 17 its analytics result by sending a Nnwdaf_Events_Subscription_Notify message or any other service procedure or message suitable for the purpose of notifying analytics and/or statistics information from the NWDAF 14 which may include parameters at least one of user QoE analytical result. User QoE analytical result is the satisfactory score of users, and it can be a range of numbers, a percentage or a range of grades.
6. The MDAS 17 performs data analytics based on the collected network data and the NWDAF's 14 analytical information, and its analytical results may include parameters, at least one of combined user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.
7. The MDAS 17 notifies the OAM MF(s) 16 its analytics result information by sending a Network slice instance capacity modification or any other service procedure or message suitable for the purpose of notifying analytics and/or statistics information from the NWDAF 14 which may include parameters at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.
8. The OAM MF(s) 16 analyses the notified analytical results from the MDAS 17 as a new request to modify the capacity of the network slice instances. After analysing the request, if it is needed, the OAM MF(s) 16 will identify the related network slice(s), derive new network requirements, and initiates modification of the capacity of identified network slice(s) (e.g. increase the number of related NFs 15 in the identified network slice(s)). It also can modify an existing NSI by using Network Slice Configuration service or any other dedicated service or procedure for the purpose. The action by the OAM MF(s) 16 could be conducted at the constituents, i.e., network slice subnets and/or at the constituent NFs 15 of network slice.

The QoS analytical results can be QoS flow-related data, such as QoS flow Bit Rate, QoS flow Packet Delay, QoS flow packet Error Rate, and whole network-related data, such as Registered Subscribers of network and network Slice Instance, End-to-end Latency of 5G Network, Downlink latency in gNB, Upstream Throughput for Network and Network Slice Instance, Downstream Throughput for Single Network Slice Instance, Upstream Throughput at N3 interface, Downstream Throughput at N3 interface, Number of PDU sessions of network and network Slice Instance, Virtualised Resource Utilization of Network Slice Instance.

Figure 13:
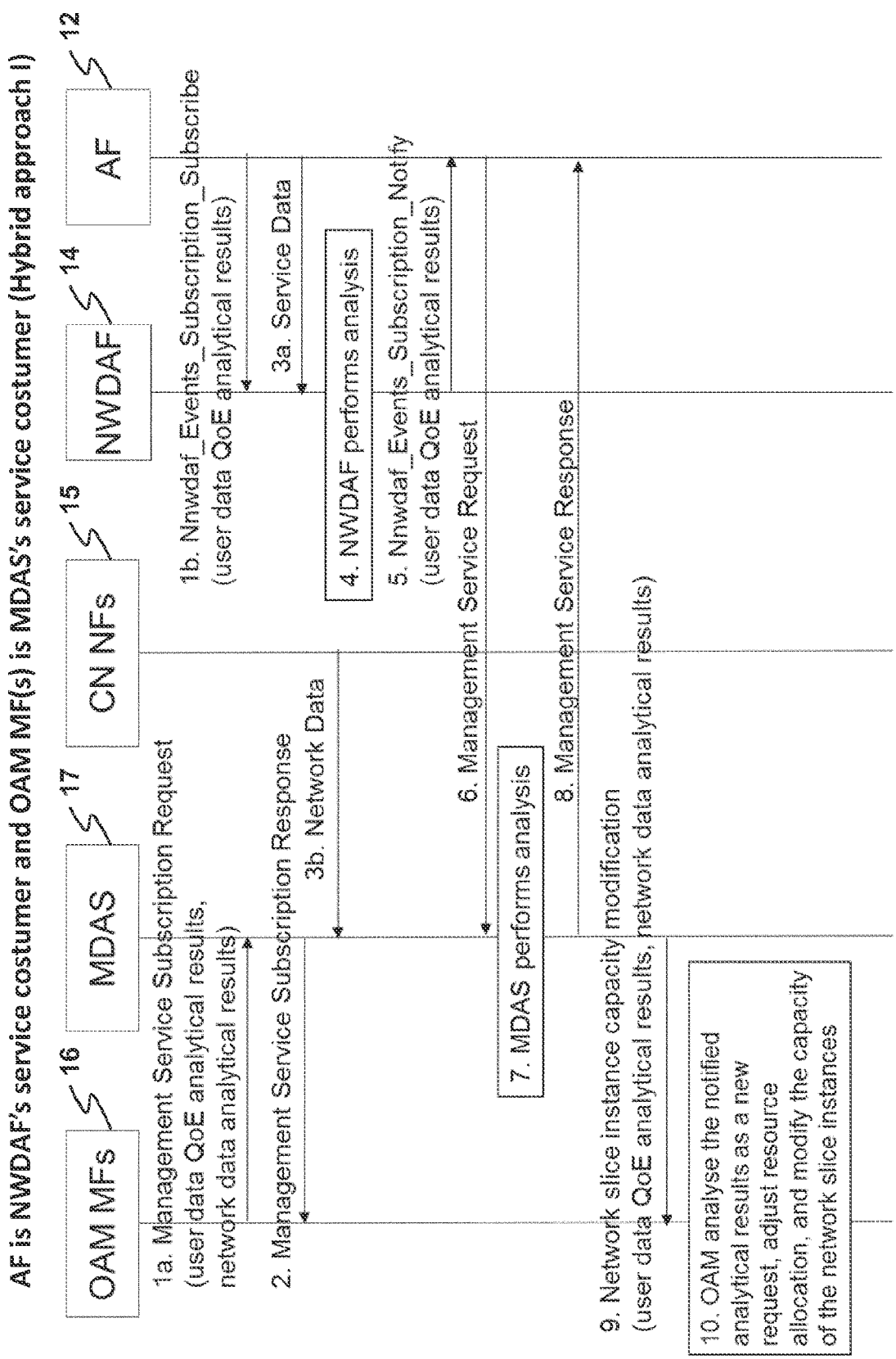

Scenario 3.2 AF is NWDAF's Service Consumer and OAM MF(s) is MDAS's Service Consumer FIG. 13 illustrates schematically an exemplary procedure in which the AF 12 is NWDAF's 14 service consumer and the OAM MF(s) 16 is the MDAS's 17 service consumer (using Hybrid approach I).

1. The OAM MF(s) 16 requests notifications from the MDAS 17 on changes in the analytics information by invoking a Management Service Subscription Request. The message may include parameters; at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.

An AF 12 subscribes to the NWDAF's 14 service by sending a Nnwdaf_Events_ Subscription_Subscribe message or any other service procedure or message suitable for the purpose of subscribing analytics and/or statistics information from the NWDAF 14.

2. The MDAS 17 acknowledges the OAM MF(s)' 16 Subscription Request via Management Service Subscription Response message.
3. The AF 12 provides user data to the NWDAF 14 and the core network NF 15 (or NFs) provides network data to the MDAS 17. If the AF 12 is trusted by the network operator, the AF 12 can send data to the NWDAF 14 directly; if the AF 12 is untrusted by the network operator, the AF 12 will be connected to the NWDAF 14 via a NEF (not shown).
4. The NDWAF 14 performs data analytics based on the collected user data, and the analytical results may include parameters, at least one of user QoE analytical result. User QoE analytical result is the satisfactory score of users, and it can be a range of numbers, a percentage or a range of grades.
5. The NWDAF 14 notifies the AF 12 with its analytics result information by sending a Nnwdaf_Events_Subscription_Notify message or any other service procedure or message suitable for the purpose of notifying analytics and/or statistics information from the NWDAF 14 which may include parameters at least one of user QoE analytical result. User QoE analytical result is the satisfactory score of users, and it can be a range of numbers, a percentage or a range of grades.
6. The AF 12 analyses the notified analytical results. If the results(s) are unsatisfied, the AF 12 will request the MDAS 17 via sending a Management Service Request message or any other service procedure or message suitable for the purpose of performing data analytics and change network capacity based on the unsatisfied QoE result.
7. The MDAS 17 performs data analytics based on the collected network data and the NWDAF's 14 analytical information, and its analytical results may include parameters, at least one of combined user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.
8. The MDAS 17 acknowledges the AF's 12 Management Service Request via a Management Service Response.
9. The MDAS 17 notifies the OAM MF(s) 16 its analytics result information by sending Network slice instance capacity modification or any other service procedure or message for the purpose of notifying analytics and/or statistics information from the NWDAF 14 which may include parameters at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.
10. The OAM MF(s) 16 analyses the notified analytical results from the MDAS 17 as a new request to modify the capacity of the network slice instances. After analysing the request, if it is needed, the OAM MF(s) 16 will identify the related network slice(s), derive new network requirements, and initiates modification of the capacity of identified network slice(s) (e.g. increase the number of related NFs 15 in the identified network slice(s)). It also can modify an existing NSI by using Network Slice Configuration service or any other dedicated service or procedure for the purpose. The action by the OAM MF(s) 16 could be conducted at the constituents, i.e., network slice subnets and/or at the constituent NFs 15 of network slice.

The QoS analytical results can be QoS flow-related data, such as QoS flow Bit Rate, QoS flow Packet Delay, QoS flow packet Error Rate, and whole network-related data, such as Registered Subscribers of network and network Slice Instance, End-to-end Latency of 5G Network, Downlink latency in gNB, Upstream Throughput for Network and Network Slice Instance, Downstream Throughput for Single Network Slice Instance, Upstream Throughput at N3 interface, Downstream Throughput at N3 interface, Number of PDU sessions of network and network Slice Instance, Virtualised Resource Utilization of Network Slice Instance.

Figure 14:
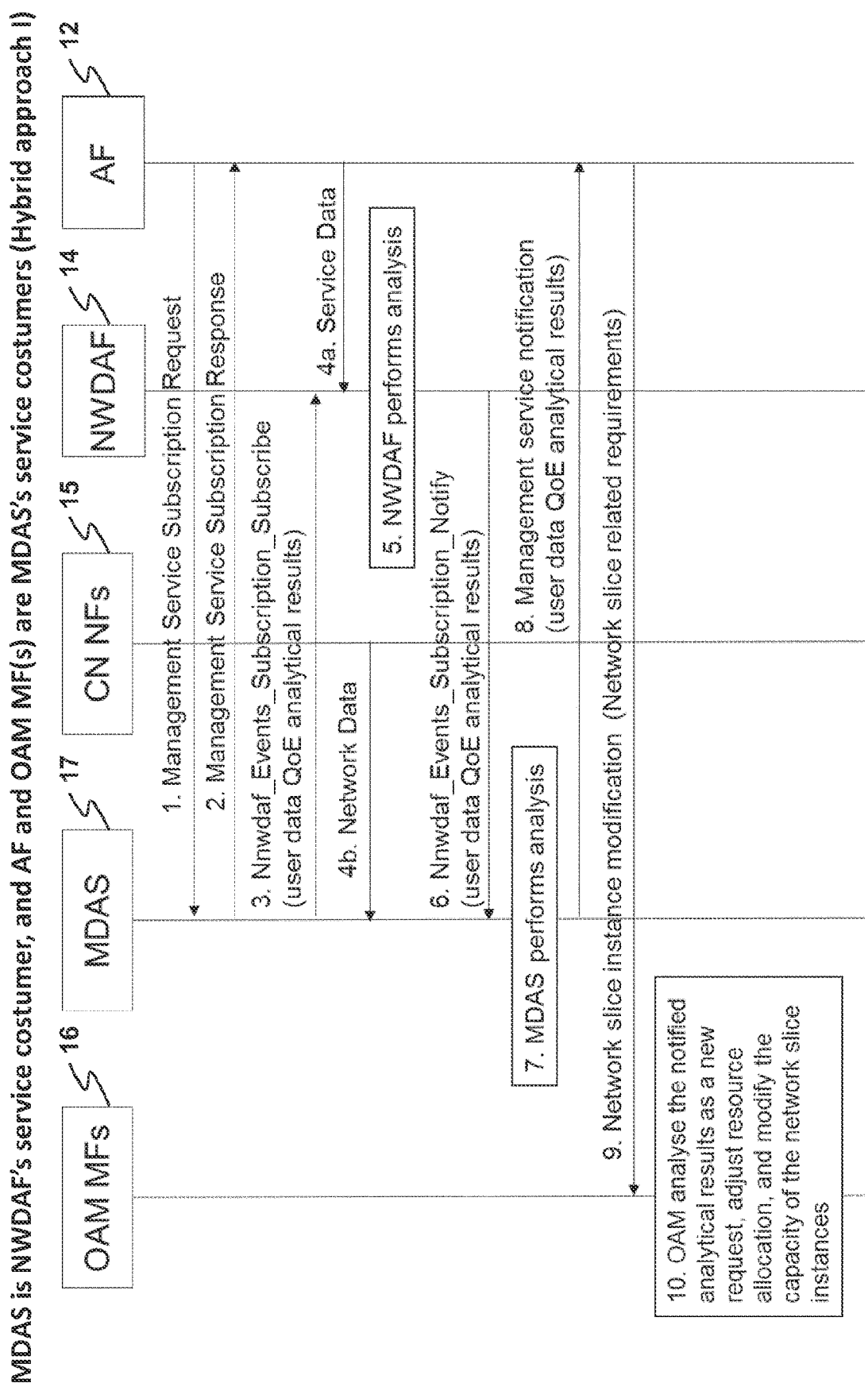

Scenario 3.3 MDAS is NWDAF's Service Consumer, and AF and OAM MF(s) are MDAS's Service Consumers FIG. 14 illustrates schematically an exemplary procedure for the scenario in which the MDAS 17 is the NWDAF's 14 service consumer, and the AF 12 and the OAM MF(s) 16 are the MDAS's 17 service consumers using Hybrid approach I.

1. The AF 12 request notifications from the MDAS 17 on changes in the analytics information by invoking a Management Service Subscription Request. The message may include parameters; at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.
2. The MDAS 17 acknowledges the AF's 12 Subscription Request via a Management Service Subscription Response message.
3. The MDAS 17 subscribes to the NWDAF's 14 service by sending a Nnwdaf Events Subscription Subscribe message or any other service procedure or message for the purpose of subscribing analytics and/or statistics information from the NWDAF 14.
4. The AF 12 provides user data to the NWDAF 14 and the core network NF 15 (or NFs) provides network data to the MDAS 17. If the AF 12 is trusted by the network operator, the AF 12 can send data to the NWDAF 14 directly; if the AF 12 is untrusted by the network operator, the AF 12 will be connected to the NWDAF 14 via a NEF (not shown).
5. The NWDAF 14 performs data analytics based on the collected user data, and the analytical results may include parameters, at least one of user QoE analytical result. User QoE analytical result is the satisfactory score of users, and it can be a range of numbers, a percentage or a range of grades.
6. The NWDAF 14 notifies the MDAS 17 its analytics result by sending a Nnwdaf_ Events_Subscription_Notify message or any other service procedure or message suitable for the purpose of notifying analytics and/or statistics information from the NWDAF 14 which may include parameters at least one of user QoE analytical result. User QoE analytical result is the satisfactory score of users, and it can be a range of numbers, a percentage or a range of grades.

7. The MDAS 17 performs data analytics based on the collected network data and the NWDAF's 14 analytical information, and its analytical results may include parameters, at least one of combined user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.

8. The MDAS 17 notifies the AF 12 with its analytics result information by sending a Management service notification message or any other service procedure or a message suitable for the purpose of notifying analytics and/or statistics information from the MDAS 17 which may include parameters at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters. One of the OAM MFs 16 can be the MDAS 17.

9. The AF 12 analyses the notified analytical results. If the results(s) are unsatisfied, the AF 12 requests the OAM 13 via sending a Network slice instance modification message or any other service procedure or message suitable for the purpose of to changing the network capacity for its service.

10. The OAM MF(s) 16 analyses the AF's 12 request to modify the capacity of the network slice instances. After analysing the request, if it is needed, the OAM MF(s) 16 will identify the related network slice(s), derive new network requirements, and initiates modification of the capacity of identified network slice(s) (e.g. increase the number of related NFs 15 in the identified network slice(s)). It also can modify an existing NSI by using Network Slice Configuration service or any other dedicated service or procedure for the purpose. The action by the OAM Mf(s) 16 could be conducted at the constituents, i.e., network slice subnets and/or at the constituent NFs 15 of network slice.

The QoS analytical results can be QoS flow-related data, such as QoS flow Bit Rate, QoS flow Packet Delay, QoS flow packet Error Rate, and whole network-related data, such as Registered Subscribers of network and network Slice Instance, End-to-end Latency of 5G Network, Downlink latency in gNB, Upstream Throughput for Network and Network Slice Instance, Downstream Throughput for Single Network Slice Instance, Upstream Throughput at N3 interface, Downstream Throughput at N3 interface, Number of PDU sessions of network and network Slice Instance, Virtualised Resource Utilization of Network Slice Instance.

Embodiment 4: Hybrid Approach II, in Which Core Network Collects and Analyses User Data and Part of Network Data, and OAM Collects and Analyses Core Network's Analytical Results and Network Data Collected by Itself FIG. 15 is a schematic overview of the so-called Hybrid approach II, in which (a function in) the core network 7 collects and analyses user data and at least a part of network data, and (a function in) the OAM 13 collects and analyses the core network's 7 analytical results and network data collected by the OAM 13 itself. This approach will be described in detail with reference to FIGS. 16 to 18. FIG. 15 highlights the relation among the OAM MFs 16, the NWDAF 14, the NFs 15, and the AF 12 for Hybrid approach II.

The term 'OAM MF' refers to any function that provides OAM services at network functional level, slicing, end user and/or network service. For example the OAM system 13 may include logical functions or entities to provide network function management services (e.g. NFMF), network slice management services (e.g. NSMF) and network slice subnet management services (e.g. NSSMF). These MFs may also be referred to by other names. The OAM system 13 may also include function(s) to provide management data analytics services, referred here as the MDAS 17. The MDAS 17 is a logical function and may be referred to by other relevant names.

1. The AF 12 provides user data to NWDAF 14.
2. The core network NF 15 (or NFs) provides part of network data to the NWDAF 14.
3. The core network NF 15 (of NFs)provides part of network data to the MDAS 17.
4. The NWDAF 14 performs data analytics based on the collected user service data and part of network data, and provides the analytical results to either the MDAS 17 or the AF 12 based on the scenarios. The analytical results may include parameters, at least one of user QoE analytical result or one of combined user QoE analytical result and network QoS/KPIs analytical results.
5. The MDAS 17 performs data analytics based on the collected network data, and the analytical results from the NWDAF 14, which is based on user service data and part of network data. The MDAS 17 provides its analytical results to either the OAM MF(s) 16, and its analytical results may include parameters, at least one of combined user QoE analytical result and network QoS/KPIs analytical results.
6. The OAM MF(s) 16 will adjust network resource allocation if needed based on the analytical results from the MDAS 17 and/or the request from the AF 12.

Figure 16:
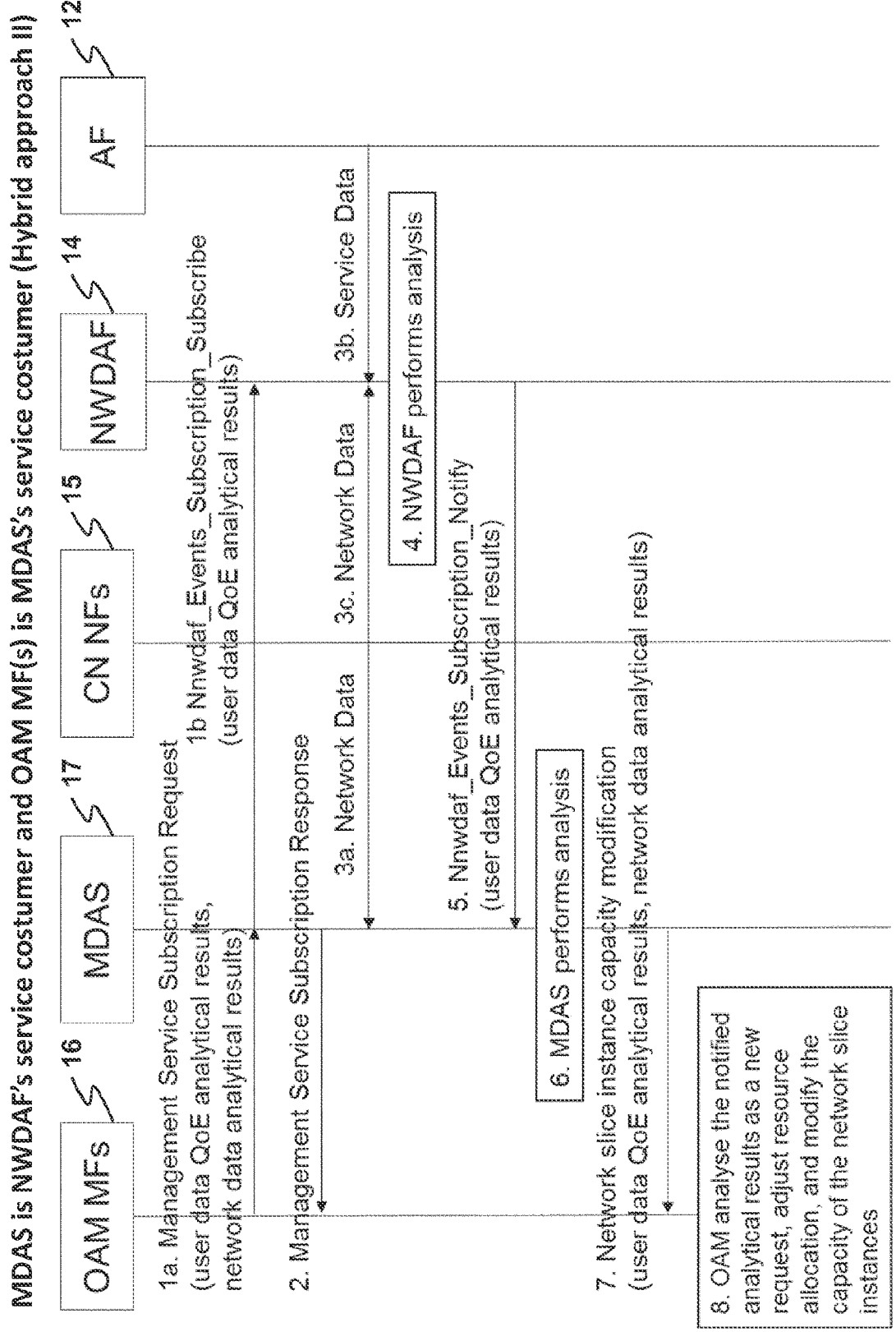

Scenario 4.1 MDAS is NWDAF's Service Consumer and OAM MF(s) is MDAS's Service Consumer FIG. 16 illustrates schematically an exemplary procedure for the scenario in which the MDAS 17 is the NWDAF's 14 service consumer and the OAM MF(s) 16 is the MDAS's 17 service consumer using Hybrid approach II.

1. The OAM MF(s) 16 request notifications from the MDAS 17 on changes in the analytics information by invoking Management Service Subscription Request. The message may include parameters; at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.

The MDAS 17 subscribes to the NWDAF's 14 service by sending an Nnwdaf_ Events_Subscription_Subscribe message or any other service procedure or message for the purpose of subscribing analytics and/or statistics information from the NWDAF 14.

2. The MDAS 17 acknowledges the OAM MF(s) 16 Subscription Request via a Management Service Subscription Response message.
3. The AF 12 provides user data to the NWDAF 14, and the core network NF 15 (or NFs) provides part of network data to the MDAS 17 and part of network data to NWDAF 14. If the AF 12 is trusted by the network operator, the AF 12 can send data to the NWDAF 14 directly; if the AF 12 is untrusted by the network operator, the AF 12 will be connected to the NWDAF 14 via a NEF (not shown). The part of network data sent to the MDAS 17 by the core network NFs 15 can be QoS flow-related data, such as QoS flow Bit Rate, QoS flow Packet Delay, QoS flow packet Error Rate. The part of network data sent to the MDAS 17 by the core network NFs 15 can be whole network-related data, such as Registered Subscribers of network and network Slice Instance, End-to-end Latency of 5G Network, Downlink latency in gNB, Upstream Throughput for Network and Network Slice Instance, Downstream Throughput for Single Network Slice Instance, Upstream Throughput at N3 interface, Downstream Throughput at N3 interface, Number of PDU sessions of network and network Slice Instance, Virtualised Resource Utilization of Network Slice Instance.
4. The NWDAF 14 performs data analytics based on the collected user service data and part of the network data, and the analytical results may include parameters, at least one of user QoE analytical result or one of combined user QoE analytical result and network QoS/KPIs analytical results. User QoE analytical result is the satisfactory score of users, and it can be a range of numbers, a percentage or a range of grades.
5. The NWDAF 14 notifies the MDAS 17 its analytics result by sending a Nnwdaf_ Events_Subscription_Notify message or any other service procedure or message suitable for the purpose of notifying analytics and/or statistics information from the NWDAF 14 which may include parameters at least one of user QoE analytical result. User QoE analytical result is the satisfactory score of users, and it can be a range of numbers, a percentage or a range of grades.
6. The MDAS 17 performs data analytics based on the collected network data and the NWDAF's analytical information, and its analytical results may include parameters, at least one of combined user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.
7. The MDAS 17 notifies the OAM MF(s) 16 its analytics result information by sending Network slice instance capacity modification or any other service procedure or any message suitable for the purpose of notifying analytics and/or statistics information which may include parameters at least one of combined user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.
8. The OAM MF(s) 16 analyses the notified analytical results from the MDAS 17 as a new request to modify the capacity of the network slice instances. After analysing the request, if it is needed, the OAM MF(s) 16 will identify the related network slice(s), derive new network requirements, and initiates modification of the capacity of identified network slice(s) (e.g. increase the number of related NFs in the identified network slice(s)). It also can modify an existing NSI by using Network Slice Configuration service or any other dedicated service or procedure for the purpose. The action by the OAM MF(s) 16 could be conducted at the constituents, i.e., network slice subnets and/or at the constituent NFs 15 of network slice.

Figure 17:
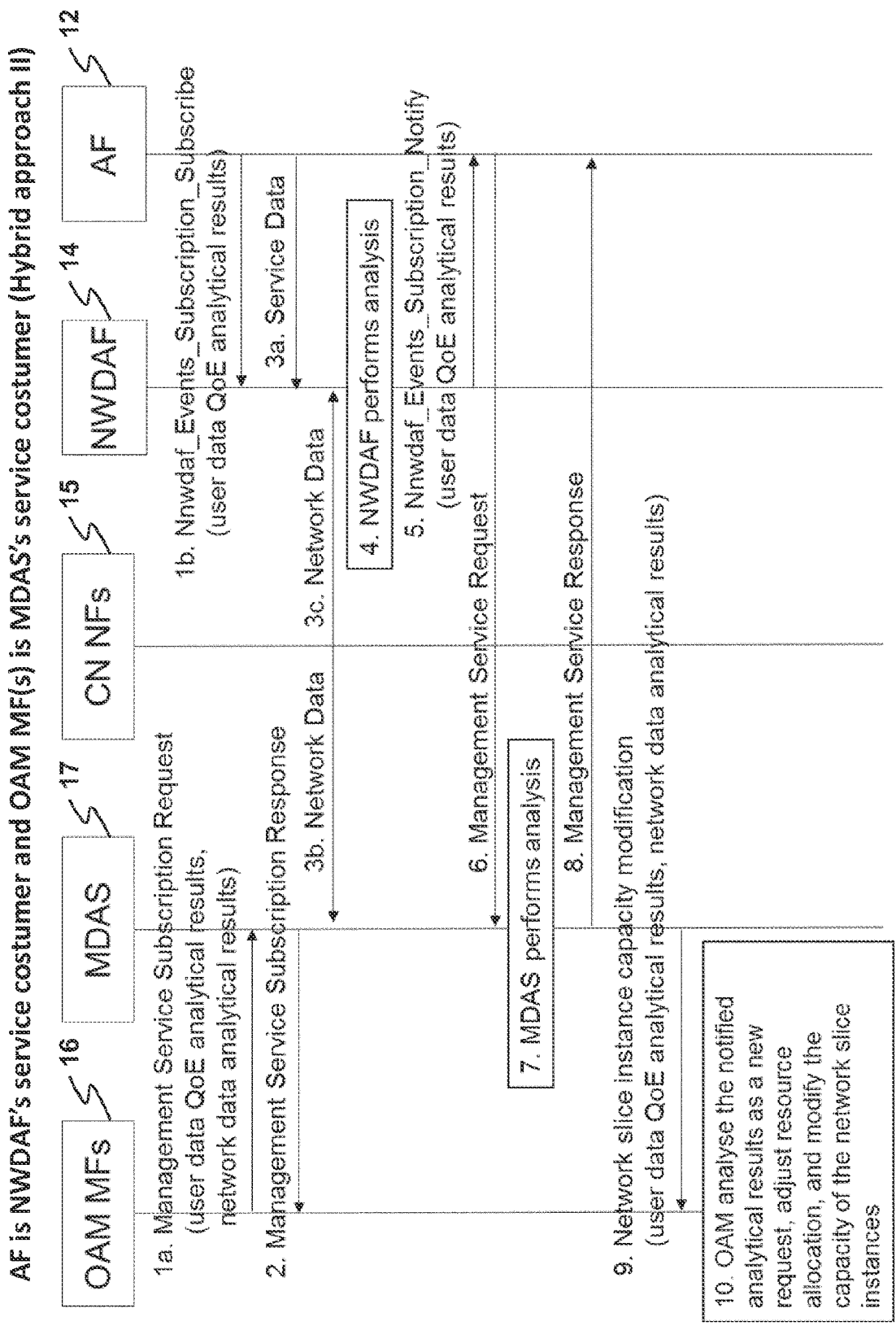

Scenario 4.2 AF is NWDAF's Service Consumer and OAM MF(s) is MDAS's Service Consumer FIG. 17 illustrates schematically an exemplary procedure for the scenario in which an AF 12 is a service consumer of both the NWDAF 14 and the OAM MF(s) 16 using Hybrid approach II.

1. The OAM MF(s) 16 requests notifications from the MDAS 17 on changes in the analytics information by invoking a Management Service Subscription Request. The message may include parameters; at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.

An AF 12 subscribes to the NWDAF's 14 service by sending a Nnwdaf_Events_ Subscription_Subscribe message or any other service procedure or message suitable for the purpose of subscribing analytics and/or statistics information from the NWDAF 14.

2. The MDAS 17 acknowledges the OAM MF(s)' 16 Subscription Request via Management Service Subscription Response message.
3. The AF 12 provides user data to the NWDAF 14, and the core network NF 15 (or NFs) provides part of network data to the MDAS 17 and part of network data to the NWDAF 14. If the AF 12 is trusted by the network operator, the AF 12 can send data to the NWDAF 14 directly; if the AF 12 is untrusted by the network operator, the AF 12 will be connected to the NWDAF 14 via a NEF (not shown). The part of network data sent to the MDAS 17 by the core network NFs 15 can be QoS flow-related data, such as QoS flow Bit Rate, QoS flow Packet Delay, QoS flow packet Error Rate. The part of network data sent to the MDAS 17 by the core network NFs 15 can be whole network-related data, such as Registered Subscribers of network and network Slice Instance, End-to-end Latency of 5G Network, Downlink latency in gNB, Upstream Throughput for Network and Network Slice Instance, Downstream Throughput for Single Network Slice Instance, Upstream Throughput at N3 interface, Downstream Throughput at N3 interface, Number of PDU sessions of network and network Slice Instance, Virtualised Resource Utilization of Network Slice Instance.
4. The NWDAF 14 performs data analytics based on the collected user service data and part of network data, and the analytical results may include parameters, at least one of user QoE analytical result or one of combined user QoE analytical result and network QoS/KPIs analytical results. User QoE analytical result is the satisfactory score of users, and it can be a range of numbers, a percentage or a range of grades.

5. The NWDAF 14 notifies the AF 12 with its analytics result information by sending a Nnwdaf_Events_Subscription_Notify message or any other service procedure or message suitable for the purpose of notifying analytics and/or statistics information from the NWDAF 14 which may include parameters at least one of user QoE analytical result. User QoE analytical result is the satisfactory score of users, and it can be a range of numbers, a percentage or a range of grades.
6. The AF 12 analyses the notified analytical results. If the results(s) are unsatisfied, the AF 12 will request the MDAS 17 via sending a Management Service Request message or any other service procedure or message suitable for the purpose of performing data analytics and change network capacity based on the unsatisfied QoE result.
7. The MDAS 17 performs data analytics based on the collected network data and the NWDAF's 14 analytical information, and its analytical results may include parameters, at least one of combined user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.
8. The MDAS 17 acknowledges the AF's Management Service Request via a Management Service Response.
9. The MDAS 17 notifies the OAM MF(s) 16 its analytics result information by sending Network slice instance capacity modification or any other service procedure or message suitable for the purpose of notifying analytics and/or statistics information which may include parameters at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.
10. The OAM MF(s) 16 analyses the notified analytical results from the MDAS 17 as a new request to modify the capacity of the network slice instances. After analysing the request, if it is needed, the OAM MF(s) 16 will identify the related network slice(s), derive new network requirements, and initiates modification of the capacity of identified network slice(s) (e.g. increase the number of related NFs 15 in the identified network slice(s)). It also can modify an existing NSI by using Network Slice Configuration service or any other dedicated service or procedure for the purpose. The action by the OAM MF(s) 16 could be conducted at the constituents, i.e., network slice subnets and/or at the constituent NFs 15 of network slice.

Figure 18:
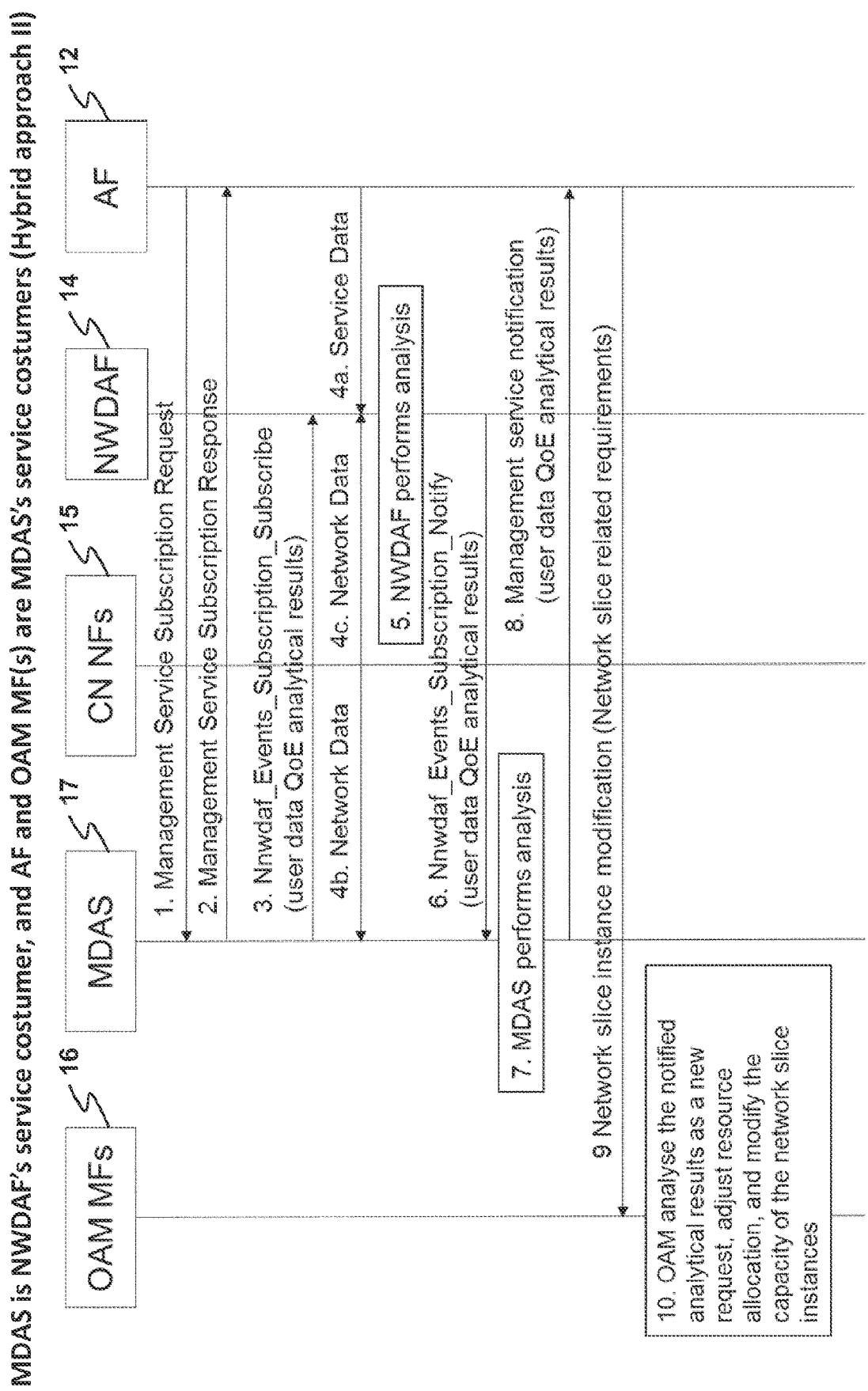

Scenario 4.3 MDAS is NWDAF's Service Consumer, and AF and OAM MF(s) are MDAS's Service Consumers FIG. 18 illustrates schematically an exemplary procedure for the scenario in which the MDAS 17 is the NWDAF's 14 service consumer, and the AF 12 and the OAM MF(s) 16 are the MDAS's 17 service consumers using Hybrid approach II.

1. The AF 12 request notifications from the MDAS 17 on changes in the analytics information by invoking Management Service Subscription Request. The message may include parameters; at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.
2. The MDAS 17 acknowledges the AF's 12 Subscription Request via a Management Service Subscription Response message.
3. The MDAS 17 subscribes to the NWDAF's 14 service by sending a Nnwdaf Events Subscription Subscribe message or any other service procedure or message suitable for the purpose of subscribing analytics and/or statistics information from the NWDAF 14.
4. The AF 12 provides user data to the NWDAF 14, and the core network NF 15 (or NFs) provides part of network data to the MDAS 17 and part of network data to the NWDAF 14. If the AF 12 is trusted by the network operator, the AF 12 can send data to the NWDAF 14 directly; if the AF 12 is untrusted by the network operator, the AF 12 will be connected to the NWDAF 14 via a NEF (not shown). The part of network data sent to the MDAS 17 by core network NFs 15 can be QoS flow-related data, such as QoS flow Bit Rate, QoS flow Packet Delay, QoS flow packet Error Rate. The part of network data sent to the MDAS 17 by the core network NFs 15 can be whole network-related data, such as Registered Subscribers of network and network Slice Instance, End-to-end Latency of 5G Network, Downlink latency in gNB, Upstream Throughput for Network and Network Slice Instance, Downstream Throughput for Single Network Slice Instance, Upstream Throughput at N3 interface, Downstream Throughput at N3 interface, Number of PDU sessions of network and network Slice Instance, Virtualised Resource Utilization of Network Slice Instance.
5. The NWDAF 14 performs data analytics based on the collected user service data and part of network data, and the analytical results may include parameters, at least one of user QoE analytical result or one of combined user QoE analytical result and network QoS/KPIs analytical results. User QoE analytical result is the satisfactory score of users, and it can be a range of numbers, a percentage or a range of grades.
6. The NWDAF 14 notifies the MDAS 17 its analytics result by sending a Nnwdaf_Events_Subscription_Notify message or any other service procedure or message suitable for the purpose of notifying analytics and/or statistics information from the NWDAF 14 which may include parameters at least one of user QoE analytical result. User QoE analytical result is the satisfactory score of users, and it can be a range of numbers, a percentage or a range of grades.
7. The MDAS 17 performs data analytics based on the collected network data and the NWDAF's 14 analytical information, and its analytical results may include parameters, at least one of combined user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters.
8. The MDAS 17 notifies the AF 12 with its analytics result information by sending Management service notification message or any other service procedure or message for the purpose of notifying analytics and/or statistics information from the MDAS 17 which may include parameters at least one of user QoE analytical result and network QoS/KPIs analytical results. User QoE analytical result is the satisfactory score of users, and it can be a range of numbers, a percentage or a range of grades. QoS analytical results can be delay, jitter, throughput, or other kinds of QoS parameters. One of the OAM MFs 16 can be the MDAS 17.

9. The AF 12 analyses the notified analytical results. If the results(s) are unsatisfied, the AF 12 will request the OAM 13 via sending a Network slice instance modification message or any other service procedure or message suitable for the purpose of to changing the network capacity for its service.

10. The OAM MF(s) 16 analyses the AF's 12 request to modify the capacity of the network slice instances. After analysing the request, if it is needed, the OAM MF(s) 16 will identify the related network slice(s), derive new network requirements, and initiates modification of the capacity of identified network slice(s) (e.g. increase the number of related NFs in the identified network slice(s)). It also can modify an existing NSI by using Network Slice Configuration service or any other dedicated service or procedure for the purpose. The action by the OAM MF(s) 16 could be conducted at the constituents, i.e., network slice subnets and/or at the constituent NFs 15 of network slice.

Beneficially, the above described exemplary embodiments include, although they are not limited to, one or more of the following functionalities:

1) Currently, OAM manages network resource based on the network data/KPIs and don't monitor the service quality at user level or service application level. In this invention, data analytics utilise not only traditionally used network data but also newly introduced user service data to optimise network resource allocation. In order to provide a flexible data analytics framework, four different embodiments have been proposed to deal with different scenarios/implementations. In these solutions, the data analytics functions can be core network based, OAM based or hybrid to meet the requirements of next generation of network automation. Its data collection methods are also flexible to adapt to the nature of different types of data.

2) Instead of purely reply on the network operator to monitor and maintain the services to honor SLA with OTT service providers, AF has been proposed as a core network service consumer and/or OAM service consumer, which allows OTT service providers to monitor the QoE of its own service. In this way, OTT service providers will play an active role in monitor/measure/maintain its service. If the service level drops below what is described in SLA with the network operator, OTT service providers can request the network operator to improve the service and therefore enforce its service agreements with network operators.

3) QoE has been taken into account of network resource allocation, besides traditional performance QoS and KPIs.

4) Previously, network resource allocation only involves network and OAM. In this solution, AF plays an important role and seamless integrates with core network and OAM. The user service data provided by AF is a key part of the proposed scheme.

The above embodiments describe a number of exemplary methods which can be summarised as:

Embodiment 1

1) AF provides user data to NWDAF.
2) Core network NFs provides network data to NWDAF.
3) NWDAF performs data analytics based on the collected data, and the analytical results may include parameters, at least one of user QoE analytical results and network QoS/KPIs analytical results.
4) The analytical results are provided to either OAM MFs or AF based on the specific scenario/implementation.
5) OAM MFs adjusts network resource allocation if needed based on either the analytical results from NWDAF or the request from AF.

Embodiment 2

1) AF provides user data to MDAS.
2) Core network NFs provides network data to MDAS.
3) MDAS performs data analytics based on the collected data, and the analytical results may include parameters, at least one of user QoE analytical result and network QoS/KPIs analytical results.
4) The analytical results are provided to either OAM MFs or AF based on the specific scenario/implementation.
5) OAM MFs adjusts network resource allocation if needed based on either the analytical results from MDAS or the request from AF.

Embodiment 3

1) AF provides user data to NWDAF.
2) Core network NFs provides network data to MDAS.
3) NWDAF performs data analytics based on the collected user service data, and provides the analytical results to either MDAS or AF based on the specific scenario/implementation. The analytical results may include parameters, at least one of user QoE analytical result.
4) MDAS performs data analytics based on the collected network data, and the analytical results from NWDAF, which is based on user service data. MDAS provides its analytical results to either OAM MFs. Its analytical results may include parameters, at least one of combined user QoE analytical result and network QoS/KPIs analytical results.
5) OAM MFs adjusts network resource allocation if needed based on the analytical results from MDAS or the request from AF.

Embodiment 4

1) AF provides user data to NWDAF,
2) Core network NFs provides part of network data to NWDAF.
3) Core network NFs provides part of network data to MDAS.
4) NWDAF performs data analytics based on the collected user service data and part of network data, and provides the analytical results to either MDAS or AF based on the specific scenario/implementation, and the analytical results may include parameters, at least one of user QoE analytical result or one of combined user QoE analytical result and network QoS/KPIs analytical results.
5) MDAS performs data analytics based on the collected network data, and the analytical results from NWDAF, which is based on user service data. MDAS provides its analytical results to either OAM MFs. Its analytical results may include parameters, at least one of combined user QoE analytical result and network QoS/KPIs analytical result.

6) OAM MFs adjusts network resource allocation if needed based on the analytical results from MDAS or the request from AF.

Benefits

The above described embodiments allow optimisation of network performance based on the data analytics on user data (in addition to network data).

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above description, the UE, the (R)AN node, and the core network/OAM node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (TO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the (R)AN node, and the core network/OAM node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network/OAM node in order to update their functionalities.

The above embodiments are also applicable to 'non-mobile' or generally stationary user equipment.

The method performed by the network function may further comprise receiving a request from said OAM management function for the provision of QoE analytics information associated with said at least one user and providing said QoE parameter in response to said request. The request may comprise a Management Data Analytics Service (MDAS) request or a subscription (e.g. a 'Nnwdaf_Events_Subscription_Subscribe' message) for QoE analytics information associated with said at least one user.

The method performed by the network function may further comprise obtaining data relating to network performance associated with said at least one user (e.g. data relating to network performance associated with at least one service used by said at least one user).

The at least one user may comprise a network slice.

The method performed by the network function may further comprise obtaining, from an application function, data relating to a service performance associated with said at least one user and performing said data analytics based on said obtained data relating to said service performance.

The QoE parameter may comprise a QoE score such as a mean opinion score (MOS).

The method performed by the network function may further comprise deriving a Key Performance Indicator (KPI) and/or a Quality of Service (QoS) parameter such as a parameter identifying a delay, a jitter, and/or a throughput for said user and providing said KPI and/or said QoS parameter to the OAM management function.

The network function may comprise a core network function such as a Network Data Analytics Function (NWDAF) or an OAM function such as a MDAS function.

The OAM management function may comprise at least one of: a Network Function Management Function (NFMF); a Network Slice Management Function (NSMF); and a Network Slice Subnet Management Function (NSSMF).

The adjusting network resource allocations by the OAM management function may comprise reconfiguring resources allocated for said at least one user at said OAM management function and/or at another function.

The method performed by the OAM management function may comprise receiving, from said network function, a 'Nnwdaf_Events_Subscription_Notify' message including said results of data analytics based on user data associated with at least one user.

Various other modifications will be apparent to those skilled in the art and will not be described in further detail here.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

References

[1] 3GPP TS 23.501 V15.2.0
[2] 3GPP TS 23.502 V15.2.0

[3] 3GPP TS 23.503 V15.2.0
[4] 3GPP TR 23.791 V0.4.0
[5] 3GPP TS 28.554 V0.3.0
[6] 3GPP TS 28.531 V0.5.0
[7] 3GPP TS 28.530 V0.7.0

Abbreviations and Terminology

The following abbreviations and terminology (whenever differently stated) are used in the current document:

3GPP 3rd Generation Partnership Project
5GS 5G System
5QI 5G QoS Indicator
AF Application Function
KPI Key Performance Indicator
MDAS Management Data Analytics Service
MF Management Function
MOS Mean Opinion Score
NEF Network Exposure Function
NF Network Function
NFMF Network Function Management Function
NSMF Network Slice Management Function
NSSMF Network Slice Subnet Management Function
NWDAF Network Data Analytics Function
OAM Operations, Administration and Maintenance
OTT Over the Top
QoE Quality of Experience
QoS Quality of Service
SLA Service Level Agreement
UE User Equipment

The invention claimed is:

1. A method performed by an Operations, Administration and Maintenance (OAM) management function, the method comprising:
receiving, from an application function, a request to change a network capacity of network resources for at least one service provided by an application function;
obtaining, from a function providing management data analytics services (MDAS), at least one of: a Quality of Experience (QoE) parameter, a Key Performance Indicator (KPI), and a Quality of Service (QoS) parameter derived based on at least one of:
data relating to at least one of service and performance, associated with at least one user provided by the application function, and
data relating to network performance associated with the at least one user; and
changing the network capacity of the network resources for the at least one service provided by the application function for the at least one user in dependence on at least one of: the QoE parameter, the KPI, and the QoS parameter.

2. The method according to claim 1, wherein the OAM management function comprises at least one of: a Network Function Management Function (NFMF), a Network Slice Management Function (NSMF), and a Network Slice Subnet Management Function (NSSMF).

3. The method according to claim 1, wherein the changing the network capacity of the network resources comprises reconfiguring resources allocated for the at least one user at the OAM management function and/or at another function.

4. The method according to claim 1, wherein:
the at least one of the QoE parameter, the KPI, and the QoS parameter is derived based on the data relating to network performance associated with the at least one user, and
the method further comprises:
receiving, from the network function, a Nnwdaf Events Subscription Notify message including results of data analytics based on the data relating to at least one of service and performance, associated with the at least one user.

5. The method according to claim 1, further comprising: based on the request:
identifying a network slice related to the application function;
deriving new network requirements of the application function; and
initiating a modification of the network capacity of the network slice.

6. The method of claim 1, wherein:
the receiving the request is performed in a case where an over the top service provider determines that the at least one of: the QoE parameter, the KPI, and the QoS parameter drops below a threshold, and
the changing the network capacity of the network resources includes improving QoE corresponding to the at least one of: the QoE parameter, the KPI, and the QoS parameter by a network provider corresponding to the OAM management function.

7. An Operations, Administration and Maintenance (OAM) management function comprising a controller and a transceiver, wherein the controller is configured to:
receive, from an application function, a request to change a network capacity of network resources for at least one service provided by an application function,
obtain, from a function providing management data analytics services, at least one of: a Quality of Experience (QoE) parameter, a Key Performance Indicator (KPI), and a Quality of Service (QoS) parameter derived based on at least one of:
data relating to at least one of service and performance, associated with at least one user provided by the application function, and
data relating to network performance associated with the at least one user; and
change the network capacity of the network resources for the at least one service provided by the application function for the at least one user in dependence on at least one of: the QoE parameter, the KPI, and the QoS parameter.

* * * * *